(12) United States Patent
Nagahama et al.

(10) Patent No.: US 8,672,492 B2
(45) Date of Patent: Mar. 18, 2014

(54) OPTICAL FILM AND METHOD FOR MANUFACTURING THE SAME, ANTIGLARE FILM, POLARIZER WITH OPTICAL LAYER, AND DISPLAY APPARATUS

(75) Inventors: Tsutomu Nagahama, Miyagi (JP); Yumi Haga, Miyagi (JP); Shinichi Matsumura, Miyagi (JP); Ryo Suzuki, Miyagi (JP)

(73) Assignee: Sony Corporation, Tokyo (JP)

( * ) Notice: Subject to any disclaimer, the term of this patent is extended or adjusted under 35 U.S.C. 154(b) by 766 days.

(21) Appl. No.: 12/672,841

(22) PCT Filed: Jun. 3, 2009

(86) PCT No.: PCT/JP2009/060573
§ 371 (c)(1),
(2), (4) Date: Feb. 9, 2010

(87) PCT Pub. No.: WO2009/151068
PCT Pub. Date: Dec. 17, 2009

(65) Prior Publication Data
US 2012/0002282 A1  Jan. 5, 2012

(30) Foreign Application Priority Data

Jun. 9, 2008 (JP) ................. 2008-151139
Aug. 13, 2008 (JP) ................. 2008-208794

(51) Int. Cl.
*G02B 27/00* (2006.01)
*G02B 5/02* (2006.01)

(52) U.S. Cl.
CPC .................. *G02B 5/0278* (2013.01)
USPC ........................................ 359/601

(58) Field of Classification Search
USPC ........................................ 359/601
See application file for complete search history.

(56) References Cited

U.S. PATENT DOCUMENTS 7,661,832 B2 *  2/2010  Iwata et al. ............... 359/601
2009/0052043 A1  2/2009  Iwata et al.

FOREIGN PATENT DOCUMENTS

JP  04-175727  6/1992
JP  09-247581  9/1997
(Continued)

OTHER PUBLICATIONS

International Search Report dated Sep. 3, 2009, for corresponding Patent Application PCT/JP2009/060573.

(Continued)

*Primary Examiner* — William Choi
(74) *Attorney, Agent, or Firm* — K&L Gates LLP

(57) ABSTRACT

An optical film includes a base member and an optical layer provided on the base member. The optical layer has an irregular shape on a surface thereof, and the irregular shape is obtained by applying a coating material containing fine particles and a resin onto the base member, distributing the fine particles densely in some regions and sparsely in other regions by convection that occurs in the coating material, and curing the coating material. The resin contains 3% by weight or more and 20% by weight or less of a polymer, the fine particles are organic fine particles having an average particle diameter of 2 μm or more and 8 μm or less, a ratio ((D/T)× 100) of the average particle diameter D of the fine particles to an average film thickness T of the optical layer is 20% or more and 70% or less, and a transmitted image clarity value measured with an optical comb having a width of 0.125 mm is 45 or more.

19 Claims, 21 Drawing Sheets

(56) References Cited

FOREIGN PATENT DOCUMENTS

| | | |
|---|---|---|
| JP | 09-306366 | 11/1997 |
| JP | 11-305010 | 11/1999 |
| JP | 2000-147244 | 5/2000 |
| JP | 2000-180611 | 6/2000 |
| JP | 2002-254573 | 9/2002 |
| JP | 2004-341070 | 2/2004 |
| JP | 2006-179274 | 7/2006 |
| JP | 2007-298996 | 11/2007 |
| JP | 2008-046497 | 2/2008 |
| WO | 2006-0088205 | 8/2006 |
| WO | 2006/088205 | 8/2006 |

OTHER PUBLICATIONS

Japanese Office Action issued Oct. 15, 2013 in corresponding Japanese Patent Application No. 2008-208794.

* cited by examiner

OPTICAL FILM AND METHOD FOR MANUFACTURING THE SAME, ANTIGLARE FILM, POLARIZER WITH OPTICAL LAYER, AND DISPLAY APPARATUS

CROSS REFERENCE TO RELATED APPLICATIONS

The present application is a National Stage of International Application No. PCT/JP2009/060573 filed on Jun. 3, 2009 and which claims priority to Japanese Patent Application No. 2008-151139 filed on Jun. 9, 2008, Japanese Patent Application No. 2008-208794 filed on Aug. 13, 2008, the entire contents of which are being incorporated herein by reference.

BACKGROUND

The present disclosure relates to an optical film and a method for manufacturing the same, an antiglare film, a polarizer with an optical layer, and a display apparatus. In particular, it relates to an optical film used in a display surface of a display apparatus such as a liquid crystal display apparatus.

In various display apparatuses such as liquid crystal displays, plasma displays, and cathode ray tube (CRT) displays, when external light such as a fluorescent lamp is reflected on the surface, a problem of a significant degradation of visibility occurs. Under these circumstances, recently, a method in which an optical multilayer film or a low-refractive-index film is provided on a surface of a display apparatus to decrease reflectivity and a method in which an optical film such as an antiglare film having fine irregularities on a surface thereof is provided to diffuse-reflect external light, thereby blurring a reflected image, have been employed.

However, the former method has the following problems. When such an optical multilayer film is used, the production cost increases and a sufficient antiglare property cannot be achieved. Even when the production cost is reduced by using a low-refractive-index film, reflection is not negligible because of a relatively high reflectivity. On the other hand, the method for blurring a reflected image by diffuse reflection using an antiglare film having fine irregularities on a surface thereof is widely used because of its low cost and high productivity.

FIG. 1 shows the structure of a conventional antiglare film. As shown in FIG. 1, an antiglare film 101 includes a base material 111 and an antiglare layer 112 provided on the base material 111. The antiglare layer 112 is constituted by a resin containing fine particles 113 composed of amorphous silica or resin beads. Fine irregularities are formed on the surface by protruding the fine particles 113 from the surface of the antiglare layer 112. This antiglare film 101 is formed by applying a coating material containing the fine particles 113, a resin, a solvent, and the like onto the base material 111 and curing the coating material. According to the antiglare film 101 having the above structure, since the fine irregularities on the surface of the antiglare layer 112 scatter light incident on the antiglare layer 112, reflection due to surface reflection is reduced.

However, the fine irregularities on the surface of the antiglare film 101 are constituted by the fine particles 113 protruding on the surface and a binder portion that connects between protrusions of the fine particles 113 with continuous slopes. Accordingly, although the antiglare film 101 has a high antiglare property, light that is transmitted through the antiglare layer 112 in the vertical direction is also strongly scattered, resulting in a problem of a decrease in the transmitted image clarity.

Consequently, as shown in FIG. 2, a conceivable approach to suppress the decrease in the transmitted image clarity is to decrease the filling ratio of the fine particles 113 in the antiglare layer 112 so as to increase the period of the irregularities on the surface of the antiglare layer 112. However, when the period of the irregularities on the surface of the antiglare layer 112 is increased to obtain gentle irregularities, a flat portion is formed at the binder portion between protrusions of the fine particles 113, resulting in a problem of a decrease in the antiglare property.

As described above, there is a trade-off between the antiglare property and the transmitted image clarity, and it is believed that it is difficult to achieve both these properties. However, recently, an antiglare film in which a decrease in the transmitted image clarity is suppressed while having an antiglare property has been desired. For example, technologies for reducing glaring and improving clarity by adjusting internal scattering while maintaining the antiglare property have been disclosed (for example, Japanese Patent Nos. 3,507,719 and 3,515,401).

However, as described above, since there is a trade-off between the transmitted image clarity and the antiglare property, it is difficult to improve the transmitted image clarity while maintaining the antiglare property. Although the antiglare property and the transmitted image clarity can be improved to some extent by the technologies disclosed in Patent Documents 1 and 2 mentioned-above, the degree of improvement is not sufficient, and further improvement in these two properties has been desired.

Also, in some cases, front surface plates for the purpose of providing mechanical, thermal, and weathering protections and a design function are arranged on the front surface (the viewer's side) of, for example, liquid crystal displays, organic EL displays, and other display apparatuses. In such cases, when a rear surface (display apparatus side) of a front surface plate has a flat shape and if, for example, the front surface plate is deflected and comes close to the display apparatus, a problem of occurrence of Newton rings occurs.

Furthermore, in the cases where another rear surface member is arranged at the rear surface side of a display apparatus, problems of deflection of members become severe, resulting in the problem of the occurrence of Newton rings. This is because the space between the display apparatus and the rear side member is narrowed with a reduction in the thickness of the display apparatus, and in addition, the size of the display apparatus is increasing. A description will be made using a liquid crystal display as an example. For example, in a liquid crystal display, a diffusing plate that makes the illuminance of light emitted from a light source uniform in a plane, a lens film for controlling the viewing angle, and a polarization separation reflective film that polarizes and separates light for reuse, and the like are arranged as the rear surface members. However, a polarizing plate disposed at the rear surface side of a liquid crystal panel and in front of these rear surface members usually has a flat surface profile. Thus, occurrence of Newton rings has been a problem in thin liquid crystal displays.

Consequently, an optical film that can suppress occurrence of such Newton rings has been desired.

Accordingly, it is desirable to provide an optical film and a method for manufacturing the same, an antiglare film, a polarizer with an optical layer, and a display apparatus that can achieve both good antiglare property and transmitted image clarity.

Furthermore, it is desirable to provide an optical film and a method for manufacturing the same, an antiglare film, a polarizer with an optical layer, and a display apparatus that can achieve both good antiglare property and image clarity and that can also suppress occurrence of Newton rings.

SUMMARY

A first embodiment provides an optical film including:
a base member; and
an optical layer provided on the base member,
wherein the optical layer has an irregular shape on a surface thereof,
the irregular shape is obtained by applying a coating material containing fine particles and a resin onto the base member, distributing the fine particles densely in some regions and sparsely in other regions, and curing the coating material in such a manner that the coating material in the regions where the fine particles are sparsely distributed is significantly shrunk compared with the coating material in the regions where the fine particles are densely distributed,
the resin contains 3% by weight or more and 20% by weight or less of a polymer,
the fine particles are organic fine particles having an average particle diameter of 2 μm or more and 8 μm or less,
a ratio ((D/T)×100) of the average particle diameter D of the fine particles to an average film thickness T of the optical layer is 20% or more and 70% or less, and
a transmitted image clarity value measured with an optical comb having a width of 0.125 mm is 45 or more.

A second embodiment provides an antiglare film including:
a base member; and
an antiglare layer provided on the base member,
wherein the antiglare layer has an irregular shape on a surface thereof,
the irregular shape is obtained by applying a coating material containing fine particles and a resin onto the base member, distributing the fine particles densely in some regions and sparsely in other regions by convection that occurs in the coating material, and curing the coating material,
the resin contains 3% by weight or more and 20% by weight or less of a polymer,
the fine particles are organic fine particles having an average particle diameter of 2 μm or more and 8 μm or less,
a ratio ((D/T)×100) of the average particle diameter D of the fine particles to an average film thickness T of the antiglare layer is 20% or more and 70% or less, and
a transmitted image clarity value measured with an optical comb having a width of 0.125 mm is 45 or more.

A third embodiment provides a method for manufacturing an optical film, including the steps of:
applying a coating material containing fine particles and a resin onto a base member and distributing the fine particles densely in some regions and sparsely in other regions by convection that occurs in the coating material; and
curing the coating material in such a manner that the coating material in the regions where the fine particles are sparsely distributed is significantly shrunk compared with the coating material in the regions where the fine particles are densely distributed to form an optical layer,
wherein the resin contains 3% by weight or more and 20% by weight or less of a polymer,
the fine particles are organic fine particles having an average particle diameter of 2 μm or more and 8 μm or less,
a ratio ((D/T)×100) of the average particle diameter D of the fine particles to an average film thickness T of the optical layer is 20% or more and 70% or less, and
a transmitted image clarity value measured with an optical comb having a width of 0.125 mm is 45 or more.

A fourth embodiment provides a polarizer with an optical layer, including:
a polarizer; and
an optical layer provided on the polarizer,
wherein the optical layer has an irregular shape on a surface thereof,
the irregular shape is obtained by applying a coating material containing fine particles and a resin, distributing the fine particles densely in some regions and sparsely in other regions by convection that occurs in the coating material, and curing the coating material,
the resin contains 3% by weight or more and 20% by weight or less of a polymer,
the fine particles are organic fine particles having an average particle diameter of 2 μm or more and 8 μm or less,
a ratio ((D/T)×100) of the average particle diameter D of the fine particles to an average film thickness T of the optical layer is 20% or more and 70% or less, and
a transmitted image clarity value measured with an optical comb having a width of 0.125 mm is 45 or more.

A fifth embodiment provides a display apparatus including:
a display unit that displays an image; and
an optical layer provided on a display surface side of the display unit,
wherein the optical layer has an irregular shape on a surface thereof,
the irregular shape is obtained by applying a coating material containing fine particles and a resin, distributing the fine particles densely in some regions and sparsely in other regions by convection that occurs in the coating material, and curing the coating material,
the resin contains 3% by weight or more and 20% by weight or less of a polymer,
the fine particles are organic fine particles having an average particle diameter of 2 μm or more and 8 μm or less,
a ratio ((D/T)×100) of the average particle diameter D of the fine particles to an average film thickness T of the optical layer is 20% or more and 70% or less, and
a transmitted image clarity value measured with an optical comb having a width of 0.125 mm is 45 or more.

A sixth embodiment provides a display apparatus including:
a display unit;
a front surface member provided at a front surface side of the display unit; and
an optical layer provided on at least one of the front surface side of the display unit and a rear surface side of the front surface member,
wherein the optical layer has an irregular shape on a surface thereof,
the irregular shape is obtained by applying a coating material containing fine particles and a resin, distributing the fine particles densely in some regions and sparsely in other regions by convection that occurs in the coating material, and curing the coating material,
the resin contains 3% by weight or more and 20% by weight or less of a polymer,
the fine particles are organic fine particles having an average particle diameter of 2 μm or more and 8 μm or less,
a ratio ((D/T)×100) of the average particle diameter D of the fine particles to an average film thickness T of the optical layer is 20% or more and 70% or less, and
a transmitted image clarity value measured with an optical comb having a width of 0.125 mm is 45 or more.

A seventh embodiment provides a display apparatus including:

a display unit;

a rear surface member provided at a rear surface side of the display unit; and an optical layer provided on at least one of the rear surface side of the display unit and a front surface side of the rear surface member, wherein the optical layer has an irregular shape on a surface thereof, the irregular shape is obtained by applying a coating material containing fine particles and a resin, distributing the fine particles densely in some regions and sparsely in other regions by convection that occurs in the coating material, and curing the coating material, the resin contains 3% by weight or more and 20% by weight or less of a polymer, the fine particles are organic fine particles having an average particle diameter of 2 μm or more and 8 μm or less, a ratio ((D/T)×100) of the average particle diameter D of the fine particles to an average film thickness T of the optical layer is 20% or more and 70% or less, and a transmitted image clarity value measured with an optical comb having a width of 0.125 mm is 45 or more.

In the present embodiment, the surface profile is formed by a particle distribution formed by drying, and curing by irradiation of ionizing radiation or heat after the drying. That is, a desired surface roughness can be achieved by controlling the distribution of the fine particles (sparseness and denseness of particles) and the cure shrinkage ratio of the resin.

As for the distribution of the fine particles, in a portion where fine particles are densely present, the ratio of the resin is low and these fine particles inhibit curing, and thus cure shrinkage is small. In contrast, in a portion where fine particles are sparsely present, the ratio of the resin is high and thus the cure shrinkage of the resin is large. Because of the difference in cure shrinkage ratio between these former and latter portions, moderate irregularities are formed on the surface of the coating material, and the surface of the antiglare layer exhibits an antiglare property.

Controlling the cure shrinkage ratio is particularly important. According to experiments, when a polymer is incorporated in an amount of 3% by weight to 20% by weight, preferably 5% by weight to 15% by weight, an adequate degree of cure shrinkage is achieved whereby desired irregularities can be formed on the surface. If the polymer content is less than 3% by weight, the cure shrinkage is large and thus the roughness of the surface is increased. Consequently, the root-mean-square slope RΔq and the arithmetic mean roughness Ra are increased, resulting in an increase in the opacity. Furthermore, in the present embodiment, a polymer is added in order to adjust the cure shrinkage as described above. However, if the polymer is excessively added in an amount of more than 20% by weight, that is, if the ratio of substances that inhibit curing in the resin increases, the viscosity of the coating material increases. As a result, the dispersibility of the fine particles is degraded, and sparseness and denseness of the fine particles become clearly identified more than necessary. Consequently, the difference in cure shrinkage notably appears between the sparse and dense portions, and the opacity increases. Furthermore, if the polymer is excessively added in an amount of more than 20% by weight, the hardness of the coating film significantly decreases.

The optical films of the present embodiment have high transmission clarity, though they have an irregular shape on the surface thereof. Therefore, the optical films of the present invention can be arranged on a front surface a display apparatus and used as antiglare layers or antiglare films. Furthermore, they can be also used as anti-Newton ring layers or anti-Newton ring films.

As described above, according to the present embodiment, an antiglare film having good antiglare property and transmitted image clarity can be obtained.

Additional features and advantages are described herein, and will be apparent from, the following Detailed Description and the figures.

DETAILED DESCRIPTION

Embodiments will now be described with reference to the drawings. Note that, in all drawings illustrating the embodiments described below, the same or corresponding components are assigned the same characters.

(1) First Embodiment (1-1) Structure of Liquid Crystal Display Apparatus

Figure 3:
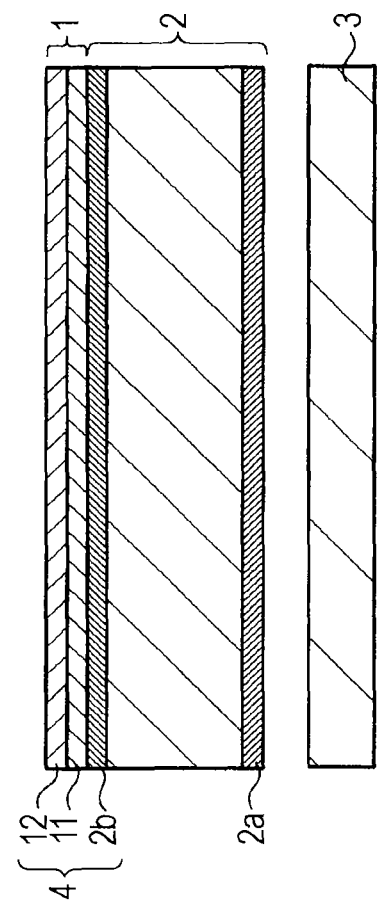
FIG. 3 is a schematic cross-sectional view showing one example of the structure of a liquid crystal display apparatus according to a first embodiment.

FIG. 3 shows one example of the structure of a liquid crystal display apparatus according to a first embodiment. As shown in FIG. 3, the liquid crystal display apparatus includes a backlight 3 that emits light and a liquid crystal panel 2 that temporally and spatially modulates light emitted from the backlight 3 to display an image. Polarizers 2a and 2b are respectively provided on two surfaces of the liquid crystal panel 2. An antiglare film 1 is provided on the polarizer 2b provided at the display surface side of the liquid crystal panel 2. In the present invention, the polarizer 2b having the antiglare film 1 or an antiglare layer on one main surface thereof is referred to as an antiglare polarizer 4.

For example, a direct-type backlight, an edge-type backlight, or a planar light source-type backlight can be used as the backlight 3. The backlight 3 includes, for example, a light source, a reflecting plate, an optical film, and the like. For example, a cold cathode fluorescent lamp (CCFL), a hot cathode fluorescent lamp (HCFL), an organic electroluminescence (OEL), an inorganic electroluminescence (IEL), a light emitting diode (LED), or the like is used as the light source.

Examples of the display mode that can be used for the liquid crystal panel 2 include a twisted nematic (TN) mode, a super twisted nematic (STN) mode, a vertically aligned (VA) mode, an in-plane switching (IPS) mode, an optically compensated birefringence (OCB) mode, a ferroelectric liquid crystal (FLC) mode, a polymer dispersed liquid crystal (PDLC) mode, and a phase change guest host (PCGH) mode.

The polarizers 2a and 2b are respectively provided on two surfaces of the liquid crystal panel 2 so that transmission axes thereof are orthogonal to each other, for example. Each of the polarizers 2a and 2b allows only one of orthogonal polarized components of incident light to pass and blocks the other component by absorption. Each of the polarizers 2a and 2b may be a uniaxially stretched hydrophilic polymer film such as a polyvinyl alcohol film, a partially formalized polyvinyl alcohol film, an ethylene-vinyl acetate copolymer partially saponified film, or the like, with a dichroic substance, such as iodine or a dichroic dye, adsorbed thereto.

(1-2) Properties of Antiglare Film

Figure 4:
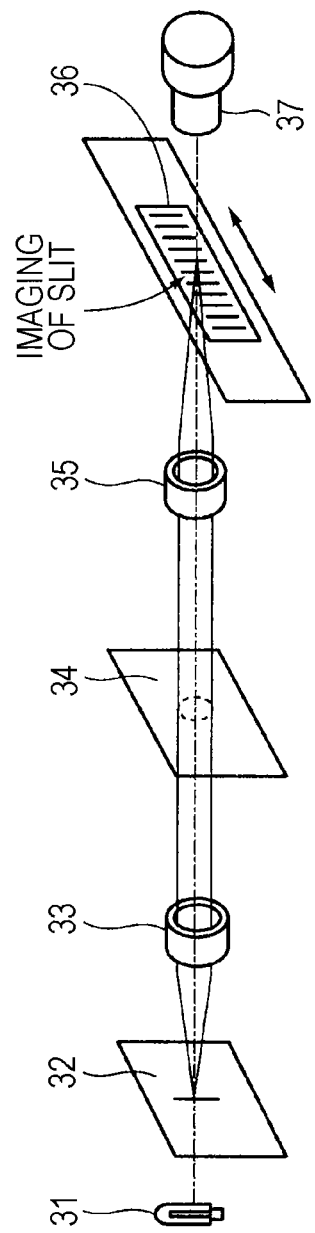
FIG. 4 is a schematic view for explaining the structure of an image clarity measuring device used in evaluating the transmitted image clarity.

The transmitted image clarity of the antiglare film 1 can be evaluated by using an image clarity measuring device in accordance with JIS-K7105 (testing methods for optical properties of plastics). This evaluation method will now be described with reference to FIG. 4. As shown in FIG. 4, an image clarity measuring device includes a light source 31, a slit 32, a lens 33, another lens 35, an optical comb 36, and a photoreceiver 37. A specimen 34 (for example, the antiglare film 1), which is an object to be measured, is disposed between the lens 33 and the lens 35. The slit 32 is disposed at the focal position of the lens 33, and the optical comb 36 is disposed at the focal position of the lens 35. Optical combs having comb widths of, for example, 2 mm, 1 mm, 0.5 mm, 0.25 mm, and 0.125 mm are provided as the optical comb 36. An appropriate optical comb is selected from these optical combs 36 and used.

In this measuring method, light emitted from the light source 31 is extracted as an artificial line light source through the slit 32 and is allowed to pass through the lens 33 so that the light is perpendicularly transmitted through the specimen 34 as parallel light. The light is then focused again using the lens 35, and the light that has passed through the optical comb 36 is received with the photoreceiver 37. The contrast between brightness and darkness is determined by calculations. In the case where there is no specimen 34 or the specimen 34 is an optically homogeneous medium, light is focused to the size of the slit 32 at the portion of the optical comb 36. Accordingly, if the aperture size of the optical comb 36 is larger than the slit 32, the quantity of light received is 100% at a position corresponding to the transparent portion of the optical comb 36 and 0% at a position corresponding to the non-transparent portion of the optical comb 36. In contrast, in the case where the specimen 34 causes blurring, the image of the slit 32 focused on the optical comb 36 becomes wide because of the effect of the blurring. Consequently, two ends of the image of the slit 32 overlap the non-transparent portions at a position corresponding to the transparent portion, and thus the quantity of light decreases from 100%. On the other hand, at a position corresponding to the non-transparent portion, light leaks from the non-transparent portions overlapping the two ends of the slit image, and thus the quantity of light increases from 0%.

In this manner, the measured transmitted image clarity value C is defined by the following equation on the basis of the transmitted light maximum value M at the transparent portion of the optical comb 36 and the transmitted light minimum value m at the non-transparent portion thereof:

$$\text{Transmitted image clarity value } C(\%) = \{(M-m)/(M+m)\} \times 100$$

A high transmitted image clarity value C indicates that the transmitted image clarity is high and a low transmitted image clarity value C indicates that the image includes so-called blurring or distortion. It should be noted that, in the description below, the transmitted image clarity value C(2.0) measured with an optical comb having a comb width of 2 mm in accordance with JIS-K7105 is referred to as "value C(2.0) at a 2-mm comb width" as needed. Similarly, the transmitted image clarity values measured with optical combs having comb widths of 1 mm, 0.5 mm, 0.25 mm, and 0.125 mm are referred to as "value C(1.0) at a 1-mm comb width", "value C(0.5) at a 0.5-mm comb width", "value C(0.25) at a 0.25-mm comb width", and "value C(0.125) at a 0.125-mm comb width", respectively, as needed.

In the antiglare film 1 of the first embodiment of the present invention, the transmitted image clarity value C measured in accordance with JIS-K7105 is set as follows whereby good contrast is achieved for fine images and highly clear images are obtained while having an antiglare property.

The value C(0.125) at a 0.125-mm comb width" of the antiglare film 1 is 45 or more and 100 or less, preferably 55 or more and 98 or less, and most preferably 65 or more and 98 or less. By controlling the value C(0.125) at a 0.125-mm comb width to 45 or more, an image having a high contrast can be obtained for fine-pitch transmitted images and, when the antiglare film 1 is applied to a display apparatus having fine-pitch pixels, a surface treatment that prevents glares can be realized.

A ratio of the value C(0.125) at a 0.125-mm comb width to the value C(2.0) at a 2-mm comb width of the antiglare film 1, i.e., ([C(0.125)/C(2.0)]×100), is preferably 50% or more and 100% or less, more preferably 65% or more and 100% or less, and most preferably 80% or more and 100% or less. Note that the ratio ([C(0.125)/C(2.0)]×100) obtained as a measured value may exceed 100, but in such cases, the ratio is considered to be 100. The feeling of roughness of the reflected image can be suppressed by controlling the ratio to 50% or more. A small ratio between these two values means that, when the surface is macroscopically observed (to an extent that can resolve 2.0 mm) and when the surface is microscopically observed (to an extent that can resolve 0.125 mm), the roughness is different from each other. In such a case, the possibility that local protrusions are formed is high, and an image appears rough when the image is reflected at such a surface.

The sum of the transmitted image clarities measured with optical combs having comb widths of 0.125 mm, 0.5 mm, 1.0 mm, and 2.0 mm, respectively, i.e., (C(0.125)+C(0.5)+C(1.0)+C(2.0)), is preferably 220 or more and 400% or less, more preferably 270 or more and 400% or less, and further preferably 300 or more and 400% or less. A display with a feeling of a high contrast can be obtained for any types of images by controlling the sum to the above ranges. The value measured using a comb having a large width is not significantly lower than the value measured using a comb having a small width. Accordingly, in the case where the sum is 220, the transmitted image clarity at a 2.0-mm width is 55 at the minimum. At a contrast value lower than this, the image appears blurred.

Highly clear images having a high contrast can be obtained by setting the transmitted image clarity value C as described above. The reason for this will now be described with reference to FIGS. 5A and 5B. Note that a case where a black and white image is displayed will be described here as an example for the purpose of ease of understanding.

Figure 5A:
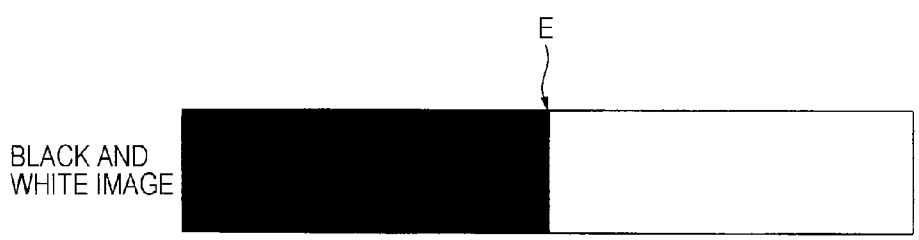
FIG. 5A is a schematic view showing a display of a black and white image.
Figure 5B:
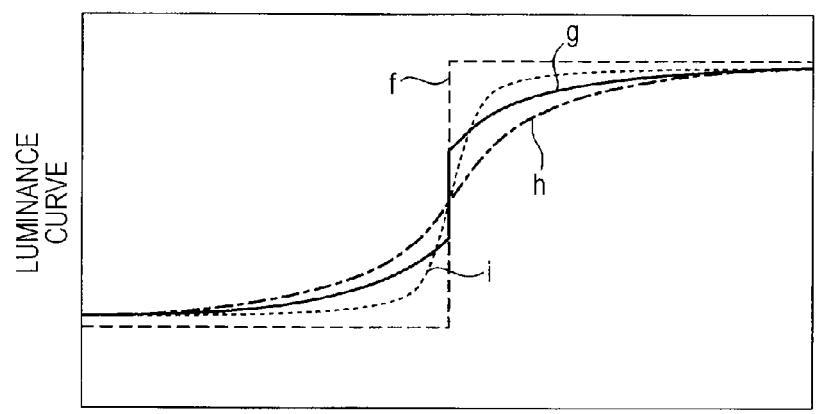
FIG. 5B is a schematic diagram showing luminance curves of transmitted images.

FIG. 5A shows a display of a black and white image, and an edge portion E shown by the arrow indicates a boundary between white and black of the image. FIG. 5B shows luminance curves of transmitted images. The luminance curves f to i in FIG. 5B represent the luminance curves below, respectively.

Luminance curve f: A luminance curve obtained when a black and white image is displayed on a screen on which no antiglare film is provided, Luminance curve h: A luminance curve obtained when a black and white image is displayed on a screen on which a conventional antiglare film is provided, Luminance curves g and i: Luminance curves each obtained when a black and white image is displayed on a screen on which the antiglare film 1 of the first embodiment is provided.

Figure 1:
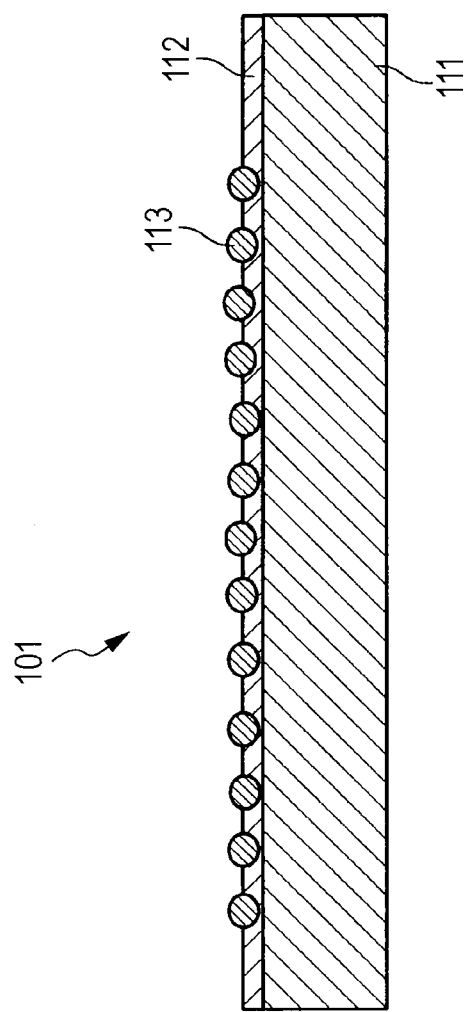
FIG. 1 is an enlarged cross-sectional view showing the structure of a conventional antiglare film.
Figure 2:
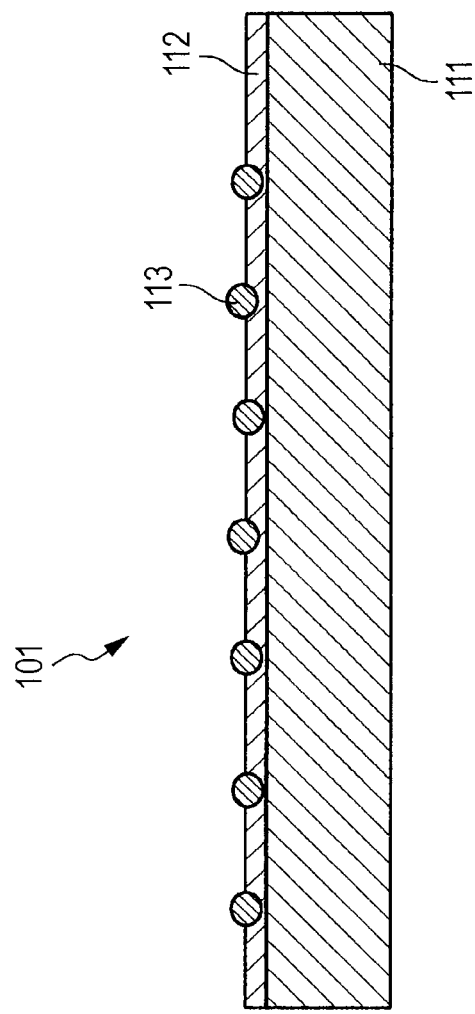
FIG. 2 is an enlarged cross-sectional view showing the structure of a conventional antiglare film.

Here, the conventional antiglare film is the antiglare film 101 shown in FIG. 1.

In the case where no antiglare film is provided on the display screen, as shown in luminance line curve f, the luminance drastically changes at the edge portion E of the black and white image, and the curve is steep. Thus, when the display screen is observed, a viewer feels that the contrast of the black and white image is very high.

In the case where the antiglare film 101 is provided on the display screen, as shown in luminance curve h, the luminance does not drastically change at the edge portion E, and the curve is gentle. Thus, the edge is not clear and a problem that an image appears blurred occurs. In the case where a transmitted image luminance shown by luminance curve h is exhibited, the value C(2.0) at a 2-mm comb width, which is a relatively large comb width, and the value C(0.125) at a 0.125-mm comb width, which is a relatively small comb width, are significantly different from each other. Consequently, the ratio of these values, i.e., C(0.125)/C(2.0) is smaller than 0.5.

In contrast, in the case where the antiglare film 1 according to the first embodiment is provided on the display screen, as shown in luminance curve g or i, the luminance gently changes at portions other than the edge portion E, but the luminance drastically changes at the edge portion E. Accordingly, even when the portions other than the edge portion E is somewhat blurred, the viewer can feel that the contrast is high. Consequently, even when the optical comb width is somewhat changed, the difference in the transmitted image clarity value C is small, and the ratio C(0.125)/C(2.0) of the value C(0.125) at a 0.125-mm comb width to the value C(2.0) at a 2-mm comb width is 0.5 or more.

As described above, in the first embodiment, a feature is defined as a ratio of the value C(0.125) at a 0.125-mm comb width to the value C(2.0) at a 2-mm comb width. This feature means that the transmitted image clarity does not significantly change between a large pitch and a small pitch.

Furthermore, it is believed that since the antiglare film 1 of the first embodiment is excellent in terms of clarity at a smaller pitch than that of conventional one, a fine image can be displayed more clearly to emphasize the edge, and an image having a high contrast can be obtained.

In the case of a large surface haze, external light incident on the display apparatus is observed as diffuse-reflected light, and thus black floating occurs over the entire surface, thereby forming an obscure image. Thus, the surface haze is preferably as low as possible, and most preferably zero. On the other hand, a completely flat surface causes a problem in that a reflected image is clearly observed. In the first embodiment, both reflection and black floating can be prevented by providing a smooth wave profile that cannot be measured as a surface haze. In order to divide the haze of the optical film of the present invention into the internal haze and the surface haze, a TAC film was bonded to a surface of the film with an optical tackiness agent therebetween to measure the haze. The measured value was larger than the haze of the optical film alone, but the reason for this is not clear. Accordingly, although the surface haze was negative values in terms of calculation, the negative surface haze was considered to be zero in the present invention. Note that it was confirmed that the haze of a TAC with another TAC bonded on a surface thereof with an optical tackiness agent therebetween was 0.5% or less.

A feature of the optical film of the present invention lies in that when the 20° glossiness of the optical film is the same as that of a conventional optical film, the 60° glossiness of the optical film of the present invention is higher than that of the conventional optical film. Ordinary display apparatuses are hardly observed from a high angle and are often observed from a low angle of about 20°, i.e., from a substantially perpendicular direction. Therefore, in order to suppress a reflected image, it is preferable that the 20° glossiness be low. Furthermore, when the 60° glossiness is low, specular reflection of external light incident from a direction of 60° is low, that is, diffuse reflection increases. Accordingly, the external light is reflected at the viewer's side, the viewer being in front of the display apparatus, which may cause a decrease in contrast. To suppress such a decrease in contrast, extensive studies were conducted on the relationship between the 20° glossiness and 60° glossiness. When the 20° glossiness is represented by Gs(20°) and the 60° glossiness is represented by Gs(60°), Gs(20°) and Gs(60°) preferably satisfy the relationship represented by formula (1) below:

$$Gs(60°) > Gs(20°) \times 0.75 + 48 \tag{1}$$

(wherein Gs(20°) is preferably in the range of Gs(20°)≤40, and more preferably in the range of 10≤Gs(20°)≤40.)

In this case, the 20° glossiness is preferably low, and specifically, preferably 40 or less, more preferably 35 or less, and further preferably 30 or less. This is because a reflected image can be suppressed as described above by controlling the 20° glossiness to the above ranges. The opacity is preferably 1.0 or less, and more preferably 0.8 or less.

In addition, in order to further improve contrast, it is necessary to suppress diffuse reflection. As a result, the 20° glossiness is as high as 40 or more. In such a case, in order to achieve both high contrast and good antiglare property, the 20° glossiness Gs(20°) and the 60° glossiness Gs(60°) preferably satisfy the relationship represented by formula (2) below:

$$Gs(60°) > Gs(20°) \times 0.25 + 72 \qquad (2)$$

(wherein Gs(20°) is preferably in the range of 40≤Gs(20°)≤80, more preferably in the range of 50≤Gs(20°)≤70, and further preferably in the range of 50≤Gs(20°)≤65.)

(1-3) Structure of Antiglare Film

Figure 6:
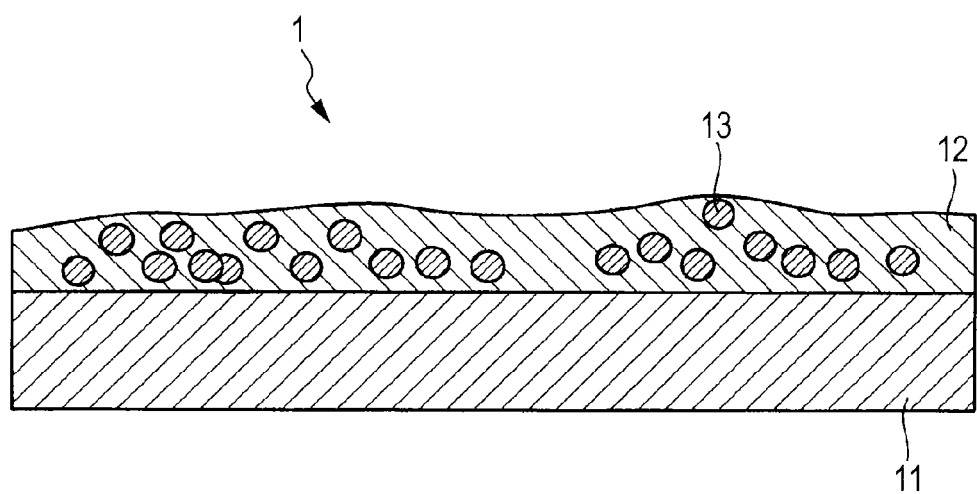
FIG. 6 is an enlarged cross-sectional view showing one example of the structure of an antiglare film 1 according to the first embodiment.

FIG. 6 is an enlarged cross-sectional view showing one example of the structure of an antiglare film 1 according to the first embodiment. As shown in FIG. 6, the antiglare film 1 includes a base member 11 and an antiglare layer 12 provided on the base member 11. The antiglare layer 12 contains fine particles 13, and fine irregularities are formed on the surface of the antiglare layer 12.

(Antiglare Layer)

The average film thickness of the antiglare layer is preferably 8 μm or more and 25 μm or less, more preferably 9 μm or more and 18 μm or less, and further preferably 10 μm or more and 14 μm or less. When the average film thickness is 8 μm or more, a sufficient hardness can be achieved. When the average film thickness is 25 μm or less, significant curling may occur in the production process. However, the antiglare film can be formed into a polarizing plate by constructing a special line equipped with a pass-roll that can correct the curling as a line for forming a polarizing plate in the subsequent step. When the average film thickness is 18 μm or less, curling may occur to some degree in the production process. However, the antiglare film can be formed into a polarizing plate without preparing the above special line for the subsequent step. When the average film thickness is 14 μm or less, curling hardly occurs in the production process and a high-quality polarizer or the like can be provided.

For example, spherical or flat organic fine particles are used as the fine particles 13. The average particle diameter of the fine particles 13 is 2 μm or more and 8 μm or less, more preferably 4 μm or more and 8 μm or less, and further preferably 5 μm or more and 8 μm or less. The reason for this is as follows. If the average particle diameter is less than 2 μm, the fine particles 13 may remain as aggregated particles in the coating material because dispersion of the fine particles 13 is difficult to achieve. Accordingly, even when the film thickness is adjusted, it is difficult to control an adequate surface profile. If the average particle diameter exceeds 8 μm, glare cannot be suppressed when the fine particles 13 are used in a high-definition display. Note that, in the present invention, the average particle diameter of the fine particles 13 is measured by a pore electrical resistance method.

The amount of fine particles 13 added is preferably 8 parts by weight or more and 50 parts by weight or less, more preferably 10 parts by weight or more and 30 parts by weight or less, and further preferably 10 parts by weight or more and 20 parts by weight or less per 100 parts by weight of the total amount of the resin. If the amount of fine particles 13 added is less than 8 parts by weight, sparseness and denseness of the fine particles 13 in the in-plane direction become clearly identified. Accordingly, the roughness increases and a clear image cannot be obtained. In contrast, if the amount of fine particles 13 added exceeds 50 parts by weight, the haze increases, the value of image clarity decreases, and the image contrast of the display apparatus also decreases as a result. However, scattering of light can be suppressed by decreasing the difference in refractive index between the fine particles 13 and the matrix. Therefore, the amount of fine particles 13 added and the difference in refractive index between the fine particles 13 and the matrix resin are preferably adjusted in accordance with the desired image contrast. The difference in refractive index between the fine particles 13 and the matrix is preferably 0.03 or less and more preferably 0.02 or less.

For example, acrylic particles, fine particles containing an acryl/styrene copolymer as a main component, and styrene particles can be used as the organic fine particles. However, fine particles containing an acryl/styrene copolymer as a main component are preferable, and fine particles containing, as a main component, an acryl/styrene copolymer having a refractive index of 1.50 to 1.56 are particularly preferable. This is because the fine particles 13 can be distributed densely in some regions and sparsely in other regions.

Even in the case where acrylic fine particles adjusted by controlling the mixing ratio of acrylic resins having different structures or different numbers of functional groups without using an acryl/styrene copolymer (without incorporating styrene) are used, the particle distribution formed during drying can also be controlled by hydrophilizing or hydrophobizing the surfaces of the fine particles.

In the case where slightly polarized fine particles, such as acrylic resin fine particles, are used as the fine particles 13, convection in the coating material that occurs during drying decreases. Thus, the fine particles are dispersed and a desired particle distribution is difficult to form. To overcome this problem, a solvent having a high surface tension must be used. However, such a solvent has a high boiling point and the resulting coating film is not readily dried, resulting in difficulty of handling during manufacturing. Accordingly, fine particles in which a non-polar resin, such as styrene, is blended are preferably used. As for fine particles containing an acryl/styrene copolymer as a main component, the surface energy can be changed by changing the composition ratio of the acryl and styrene in synthesis. Among fine particles containing acryl/styrene copolymers as main components, those having a mixing ratio that achieves a refractive index of 1.50 to 1.56 are preferable, and those having a mixing ratio that achieves a refractive index of 1.505 to 1.545 are particularly preferable. This is because a desired particle distribution can be achieved, and a desired surface profile can be obtained by adding a process of controlling cure shrinkage.

A ratio ((D/T)×100) of the average particle diameter D of the fine particles to the average film thickness T of the antiglare layer is 20% or more and 70% or less. The reason for this is as follows. If the ratio is less than 20%, the surface readily becomes flat and it is difficult to control an adequate wave profile. If the ratio exceeds 70%, the fine particles 13 protrude from the surface, thus increasing opacity.

(Base Member)

For example, a film, sheet, or substrate having transparency can be used as the base member 11. For example, known polymer materials can be used as the material for the base member 11. Examples of the known polymer materials include triacetyl cellulose (TAC), polyesters (TPEE), polyethylene terephthalate (PET), polyimides (PI), polyamides (PA), aramids, polyethylene (PE), polyacrylates, polyethersulfone, polysulfone, polypropylene (PP), diacetyl cellulose, polyvinyl chloride, acrylic resins (PMMA), polycarbonate (PC), epoxy resins, urea resins, urethane resins, and melamine resins. The thickness of the base member 11 is preferably 38 μm to 100 μm from the standpoint of productivity but is not particularly limited to this range.

The base member 11 preferably has a function as a protective film of the polarizer 2b. This is because a protective film need not be separately provided on the polarizer 2b, and thus the thickness of the polarizer 2b having the antiglare film 1 can be reduced.

(1-3) Method for Manufacturing Antiglare Film

Next, an example of a method for manufacturing the antiglare film 1 having the above-described structure will be described. The method for manufacturing the antiglare film 1 includes applying a coating material containing fine particles 13, a resin, and a solvent onto a base member 11, drying the solvent, and then curing the resin.

(Preparation of Coating Material)

First, for example, a resin, fine particles 13, and a solvent are mixed in a stirrer, such as a disper, or a dispersion machine, such as a bead mill, to obtain a coating material in which the file particles 13 are dispersed. In this step, a photostabilizer, an ultraviolet absorber, an antistatic agent, a flame retardant, an antioxidant, and the like may be added, if necessary. In addition, silica fine particles or the like may further be added as a viscosity modifier.

For example, an organic solvent that dissolves the resin material used, that has good wettability with the fine particles 13, and that does not bleach the base member 11 can be used as the solvent. Examples of the organic solvent include tertiary butanol, isopropyl acetate, and the like.

The resin contains a polymer and an oligomer and/or monomer, preferably contains a polymer and an oligomer. Specifically, the resin contains 3% by weight or more and 20% by weight or less polymer and 80% by weight or more and 97% by weight or less oligomer and/or monomer, and more preferably contains 5% by weight or more and 15% by weight or less polymer and 85% by weight or more and 95% by weight or less oligomer and/or monomer. The polymer is added in order to adjust cure shrinkage. If the polymer content is less than 3% by weight, the cure shrinkage is large, and the surface is roughened, the root-mean-square slope RΔq and the arithmetic mean roughness Ra are increased, and the opacity is increased. In contrast, when a polymer is excessively added in an amount of more than 20% by weight, the ratio of substances that inhibit curing in the resin increases and the viscosity of the coating material increases. As a result, the dispersibility of the fine particles 13 is degraded, and sparseness and denseness of the fine particles 13 become clearly identified more than necessary. As a result, the difference in cure shrinkage notably appears between the sparse portions and the dense portions, thereby increasing the opacity. Furthermore, when a polymer is excessively added in an amount of more than 20% by weight, a decrease in the hardness of the antiglare layer 12 becomes also significant.

The Martens hardness of the antiglare layer 12 is preferably 220 N/mm$^2$ or more. When the polymer is added in an amount more than 20 parts by weight, it is difficult to achieve a Martens hardness of 220 N/mm$^2$ or more.

In the present invention, the Martens hardness is determined by the following evaluation method.

An antiglare layer 12 is formed on a base member 11. A portion where no fine particles 13 are present is selected, and a surface hardness is measured by an indentation method under the conditions below.

Measuring device: PICODENTOR HM-500 (Fischer Instruments K.K.)

Indenter: Vickers indenter

Maximum indentation depth: 10% or less of the thickness of the coating film (the thickness of the AG layer)

From the standpoint of ease of manufacturing, the resin is preferably an ionizing radiation-curable resin that is cured by ultraviolet rays or electron beams or a thermosetting resin that is cured by heat. A photosensitive resin that can be cured by ultraviolet rays is most preferable. Examples of such a photosensitive resin include acrylate resins such as urethane acrylates, epoxy acrylates, polyester acrylates, polyol acrylates, polyether acrylates, and melamine acrylates. As for characteristics after curing, a resin that exhibits a good light-transmitting property in view of a good image-transmitting property and a resin that has a high hardness in view of scratch resistance are particularly preferable. Such a resin can be appropriately selected. Note that the ionizing radiation-curable resin is not particularly limited to ultraviolet-curable resins, and any ionizing radiation-curable resin having a light-transmitting property can be used. However, a resin that does not cause a significant change in the hue of transmitted light and the amount of transmitted light due to coloring and haze is preferable.

Such a photosensitive resin can be obtained by blending a photopolymerization initiator with organic materials, such as monomers, oligomers, and polymers, which can form the resin. For example, a urethane acrylate resin is produced by allowing a polyester polyol to react with an isocyanate monomer or prepolymer and then allowing the resulting reaction product to react with a hydroxyl-group-containing acrylate or methacrylate monomer.

Examples of the photopolymerization initiator contained in the photosensitive resin include benzophenone derivatives, acetophenone derivatives, and anthraquinone derivatives. These may be used alone or in combinations. A component that improves coating film formation, e.g., an acrylic resin, may further be appropriately selected and blended with the photosensitive resin.

In addition, a urethane resin, an acrylic resin, a methacrylic resin, a styrene resin, a melamine resin, or a cellulosic resin that can be fixed at least by drying, an ionizing radiation-curable oligomer, or a thermosetting oligomer can be appropriately mixed with photosensitive resin and used. The hardness and curling of the antiglare layer 12 can be adjusted by appropriately mixing such resins. These resins are not limited thereto. Preferably, a polymer that has an ionizing radiation-sensitive group, such as an acrylic double bond, or a thermosetting group, such as an —OH group, can be used.

Furthermore, it is preferable to adjust the difference in surface tension between the fine particles 13 and resin. This is because the shape of the cured resin connecting between fine particles 13 can be controlled during drying and curing of the resin.

(Application)

Next, the coating material obtained as described above is applied onto the base member 11. The coating material is applied so that the average film thickness after drying is preferably 8 μm or more and 25 μm or less, more preferably 9 μm or more and 18 μm or less, and further preferably 10 μm or more and 14 μm or less. This is because a sufficient hardness is not achieved at an excessively small average film thickness, and curling occurs in the step of curing the resin during manufacturing at an excessively large average film thickness. The application method is not particularly limited and any known application method can be employed. Examples of the known application methods include a microgravure coating method, a wire-bar coating method, a direct gravure coating method, a die coating method, a dipping method, a spray coating method, a reverse roll coating method, a curtain coating method, a comma coating method, a knife coating method, and a spin-coating method.

(Drying and Curing)

After application of the coating material, drying and curing are conducted to obtain an antiglare layer 12. In this step, an irregular shape that has a longer period and is gentle (i.e., a root-mean-square slope RΔq that is adequately small) compared with that of a conventional antiglare layer is formed on the surface of the antiglare layer 12. In this step, individual fine particles 13 are not uniformly dispersed but are intentionally distributed densely in some portions and sparsely in other portions by the convection during drying. A portion where the fine particles 13 are densely gathered forms one peak, and thus a surface profile having smooth waves is formed. Furthermore, the drying temperature and the drying time can be appropriately determined on the basis of the boiling point of the solvent contained in the coating material. In such a case, the drying temperature and the drying time are preferably set in the ranges where deformation of the base member 11 due to thermal shrinkage does not occur in consideration of heat resistance of the base member 11.

The drying step and curing step will be specifically described below.

First, the coating material applied on the base member 11 is dried at a predetermined temperature to generate convection in the coating material and to distribute the fine particles 13 densely in some regions and sparsely in other regions by the convection.

The degree of distribution of the fine particles 13, the distribution including sparse portions and dense portions, can be selected, for example, by appropriately adjusting the surface tension of the solvent and the surface energy of the fine particles 13. In addition, the drying temperature and the drying time can be appropriately set on the basis of the boiling point of the solvent contained in the coating material. In such a case, the drying temperature and the drying time are preferably set in the ranges where deformation of the base member 11 due to thermal shrinkage does not occur in consideration of heat resistance of the base member 11.

The drying conditions are not particularly limited. The drying may be natural drying or artificial drying in which the drying temperature and the drying time are adjusted. However, in the case where the surface of the coating material is exposed to wind during drying, it is preferable that wind ripples do not form on the surface of the coating film. The reason for this is as follows. If wind ripples are formed, the desired gently wavy irregular shape does not tend to be formed on the surface of the antiglare layer, and thus it becomes difficult to achieve both the antiglare property and the contrast.

Next, the resin dried on the base member 11 is cured by, for example, irradiation of ionizing radiation or heating. As a result, gentle irregularities are formed on the surface of the coating material because of the difference in cure shrinkage ratio between the portions where the fine particles 13 are densely distributed and the portions where the fine particles 13 are sparsely distributed. That is, a portion where the fine particles 13 are densely distributed forms one peak, and thus waves having a large period are formed. That is, an irregular shape that has a longer period and is gentle as compared with that of a conventional antiglare layer is formed on the surface of the antiglare layer 12.

For example, electron beams, ultraviolet rays, visible rays, gamma rays, electron beams, or the like can be used as the ionizing radiation. Ultraviolet rays are preferable from the standpoint of production equipment. Examples of the ultraviolet ray source that can be used include an ultra-high-pressure mercury lamp, a high-pressure mercury lamp, a low-pressure mercury lamp, a carbon arc, a xenon arc, and a metal halide lamp. Preferably, the integrated exposure dose is adequately selected in consideration of the curing properties of the resin, suppression of yellowing of the resin and the base member 11, and the like. Examples of the atmosphere of irradiation include air and an inert gas atmosphere such as nitrogen or argon.

As a result, a target antiglare film is obtained.

As described above, according to this first embodiment, the antiglare layer 12 is obtained by applying the fine particles 13 and the resin onto the base member 11, distributing the fine particles 13 densely in some regions and sparsely in other regions, and conducting curing so that the coating material in the regions where the fine particles 13 are sparsely distributed is significantly shrunk compared with the coating material in the regions where the fine particles 13 are densely distributed. Here, the resin contains 3% by weight or more and 20% by weight or less polymer and 80% by weight or more and 97% by weight or less oligomer and/or monomer, the fine particles 13 are organic fine particles having an average particle diameter of 2 μm or more and 8 μm or less, and the ratio ((D/T)×100) of the average particle diameter D of the fine particles 13 to the average film thickness T is 20% or more and 70% or less. The transmitted image clarity value measured with an optical comb having a width of 0.125 mm is 45 or more. Accordingly, the antiglare film 1 having good antiglare property and transmitted image clarity can be obtained.

(2) Second Embodiment (2-1) Structure of Antiglare Film

Figure 7:
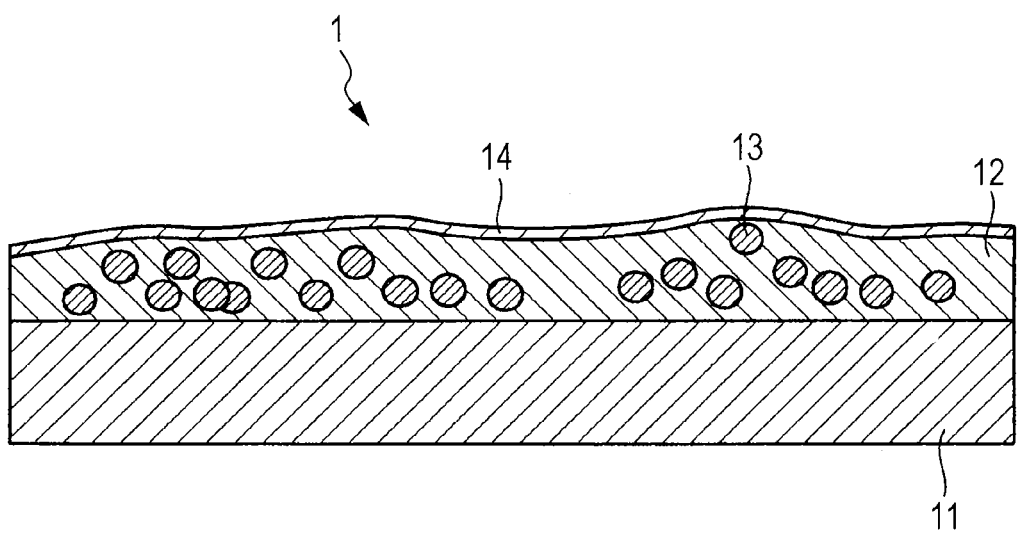
FIG. 7 is an enlarged cross-sectional view showing one example of the structure of an antiglare film according to a second embodiment.

FIG. 7 shows one example of the structure of an antiglare film according to a second embodiment. As shown in FIG. 7, an antiglare film 1 of this second embodiment differs from the first embodiment in that a low-refractive-index layer 14 is further provided on an antiglare layer 12. Since a base member 11 and the antiglare layer 12 are the same as those in the first embodiment, they are assigned the same reference characters and a description thereof is omitted.

As shown in FIG. 7, the low-refractive-index layer 14 is preferably provided so as to follow the waves on the surface of the antiglare layer. More preferably, the low-refractive-index layer 14 has a substantially uniform thickness, and the waves of the surface of an antireflection layer have gentle waves substantially the same as those of the surface of the antiglare layer. According to this structure, even when the low-refractive-index layer 14 is provided, both contrast and antiglare property can be achieved. Note that, although it is ideal that the low-refractive-index layer 14 have a substantially uniform thickness as described above, the low-refractive-index layer 14 need not be provided over the entire region of the antiglare layer 12. A sufficient contrast can be achieved as long as the low-refractive-index layer is substantially uniformly provided over the most portions of the antiglare layer 12 excluding the protruding portions, that is, over relatively flat and smooth portions having a high reflectivity.

Figure 8:
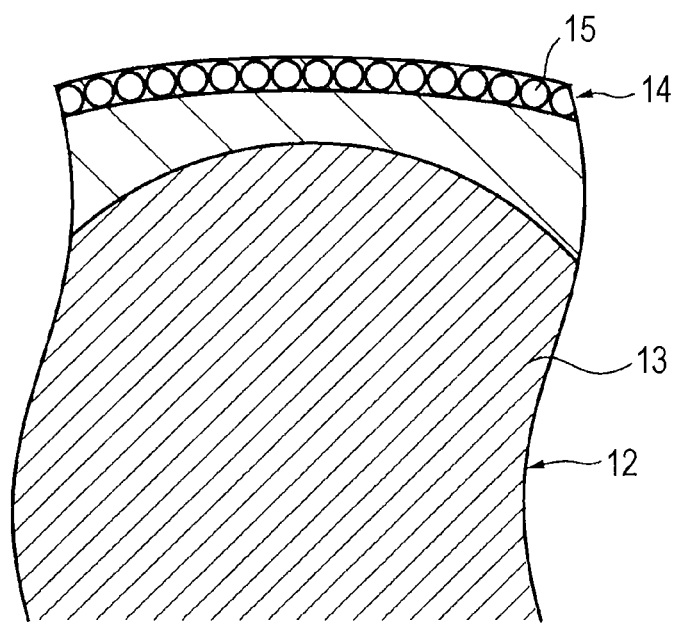
FIG. 8 is an enlarged cross-sectional view of a low-refractive-index layer 14 shown in FIG. 6.

FIG. 8 is an enlarged cross-sectional view of the low-refractive-index layer 14 shown in FIG. 7. As shown in FIG. 8, the low-refractive-index layer 14 includes, for example, a resin and hollow fine particles 15. The hollow fine particles 15 are preferably dispersed over the entire surface of the antiglare layer 12. In addition, preferably, the hollow fine particles 15 are embedded in the low-refractive-index layer 14, and the embedded hollow fine particles 15 form a layer of the hollow fine particles 15 in which about two to three particles are overlapped in the thickness direction of the low-refractive-index layer 14.

(2-2) Method for Manufacturing Antiglare Film

Next, one example of a method for manufacturing the antiglare film of the second embodiment will be described. This method for manufacturing the antiglare film of the second embodiment differs from the first embodiment in that the method further includes a step of forming the low-refractive-index layer, the step being conducted after the step of forming the antiglare layer. Accordingly, only the step of forming the low-refractive-index layer will be described below.

(Preparation of Coating Material)

First, for example, hollow fine particles 15, a resin, and a solvent are mixed in a stirrer, such as a disper, or a dispersion machine, such as a bead mill, to prepare a coating material. In addition, additives such as a photostabilizer, an ultraviolet absorber, an antistatic agent, a flame retardant, an antioxidant, and the like may be added, if necessary.

As the resin, an ionizing radiation-curable resin that can be cured by irradiation of light, an electron beam, or the like and a thermosetting resin that can be cured by heat can be used alone or in combinations. From the standpoint of ease of manufacturing, a photosensitive resin that can be cured by ultraviolet rays is most preferable. The ionizing radiation-curable resin preferably contains 90% or more of a polyfunctional monomer. Examples of the polyfunctional monomer include esters of a polyhydric alcohol and (meth)acrylic acid. Specifically, examples thereof include ethylene glycol di(meth)acrylate, 1,4-dicyclohexane diacrylate, pentaerythritol tetra(meth)acrylate, pentaerythritol tri(meth)acrylate, trimethylolpropane tri(meth)acrylate, trimethylolethane tri(meth)acrylate, dipentaerythritol tetra(meth)acrylate, dipentaerythritol penta(meth)acrylate, dipentaerythritol hexa(meth)acrylate, 1,2,3-cyclohexane tetramethacrylate, polyurethane polyacrylate, and polyester polyacrylate.

Examples of the hollow fine particles 15 include inorganic fine particles such as silica and alumina, and organic fine particles such as styrene and acryl. Silica fine particles are particularly preferable. Since the hollow fine particles 15 contain air inside, the refractive index thereof is lower than that of normal fine particles. For example, whereas the refractive index of silica fine particles is 1.46, the refractive index of hollow silica fine particles is 1.45 or less.

The average particle diameter of the hollow fine particles 15 is preferably 10 to 200 nm and more preferably 30 to 60 nm. If the average particle diameter exceeds 200 nm, the size is not negligible compared with the visible light wavelength, and thus light is scattered on the surface of the low-refractive-index layer 14. As a result, the transparency is degraded and a display surface and the like appear whitish. If the average particle diameter is less than 10 nm, the hollow fine particles 15 tend to aggregate. Furthermore, from the standpoint of improving the compatibility with the resin, the hollow fine particles 15 such as hollow silica fine particles preferably have (meth)acryloyl groups polymerizable with an ionizing radiation on the surfaces thereof.

For example, modified silicon acrylate compounds or the like may be used as the additive. Specific examples thereof include compounds having at least one organic group in a dimethyl silicon molecule. The equivalent of the organic group bonded to dimethyl silicon is preferably 1,630 g/mol or more. As for a method of measuring the equivalent of the organic group, the equivalent of the organic group can be calculated using a nuclear magnetic resonance (NMR) measuring method from the peak intensity ratio of $^1$H of the methyl groups and $^1$H of the organic group in the dimethyl silicon molecule. Examples of the organic group include a methacryl group, an acryl group, and a mercapto group.

A solvent that dissolves the resin used but that does not dissolve the underlying antiglare layer 12 is preferred as the solvent. Examples of such a solvent include organic solvents such as tertiary butanol, toluene, methyl ethyl ketone (MEK), isopropyl alcohol (IPA), and methyl isobutyl ketone (MIBK).

(Application)

Next, the coating material prepared as described above is applied onto the antiglare layer 12. Examples of the method of applying the coating material include a gravure coater, a bar coater, a die coater, a knife coater, a comma coater, a spray coater, and a curtain coater. It should be noted that the application method is not limited to those described above and any method can be employed as long as a coating material can be uniformly applied so as to have a predetermined thickness.

(Drying and Curing)

Next, the coating material applied on the antiglare layer 12 is dried and cured. Consequently, a low-refractive-index layer 14 with a gentle irregular shape is formed on the antiglare layer 12. The drying and curing methods the same as those used in the above-described process of preparing the antiglare layer of the first embodiment can be employed.

As a result, a target antiglare film 1 is obtained.

According to this second embodiment, since the low-refractive-index layer 14 is further provided on the antiglare layer 12, the reflectivity can be further decreased compared with the first embodiment described above.

(3) Third Embodiment

Figure 9:
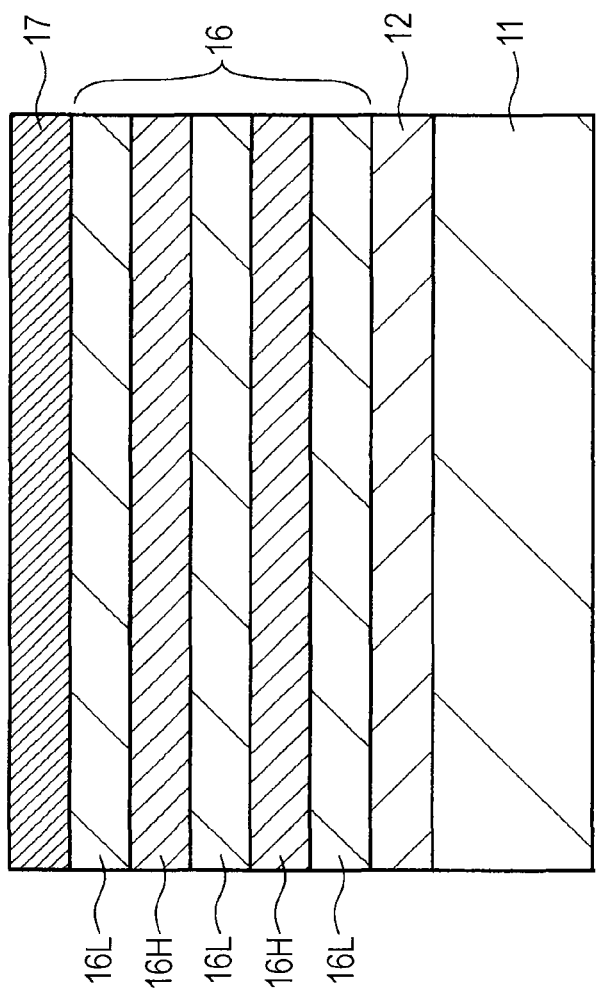
FIG. 9 is a schematic cross-sectional view showing one example of the structure of an antiglare film according to a third embodiment.

FIG. 9 shows one example of the structure of an antiglare film according to a third embodiment. As shown in FIG. 9, an antiglare film 1 differs from the above-described first embodiment in that a multilayered antireflection layer is provided on an antiglare layer 12. Since a base member 11 and the antiglare layer 12 are the same as those in the above-described first embodiment, they are assigned the same reference characters and a description thereof is omitted.

A multilayered antireflection layer 16 is a stacked film including both low-refractive-index layers 16L and high-refractive-index layers 16H. Preferably, the number of stacks of the low-refractive-index layers 16L and the number of stacks of the high-refractive-index layers 16H are adequately selected in accordance with desired characteristics. Examples of the material for the low-refractive-index layers 16L that can be used include, but are not particularly limited to, $SiO_x$, $SiO_2$, $Al_2O_3$, and mixtures thereof. The material can be adequately selected from known low-refractive-index materials in accordance with characteristics required for the low-refractive-index layers 16L and used. Examples of the material for the high-refractive-index layers 16H that can be used include, but are not particularly limited to, $TiO_2$, $Nb_2O_5$, $Ta_2O_5$, $WO_3$, and mixtures thereof. The material can be adequately selected from known high-refractive-index materials in accordance with characteristics required for the high-refractive-index layers 16H and used. A sputtering method is preferably used as a method for depositing the low-refractive-index layers 16L and the high-refractive-index layers 16H, but the method is not limited to this.

In addition, as shown in FIG. 9, from the standpoint of, for example, suppressing the adhesion of contamination on the surface of the antiglare film 1, an antifouling layer 17 may be further provided on the multilayered antireflection layer 16, as required. A fluorine-based compound is preferably used as the antifouling layer 17, but the antifouling layer 17 is not limited thereto.

According to this third embodiment, since the multilayered antireflection layer 16 is further provided on the antiglare layer 12, the reflectivity can be further decreased compared with the first embodiment described above.

(4) Fourth Embodiment

In a fourth embodiment, an optical film used as an antiglare film in the first embodiment is used as an "anti-Newton ring (ANR) film" (hereinafter referred to as "ANR film").

Figure 10:
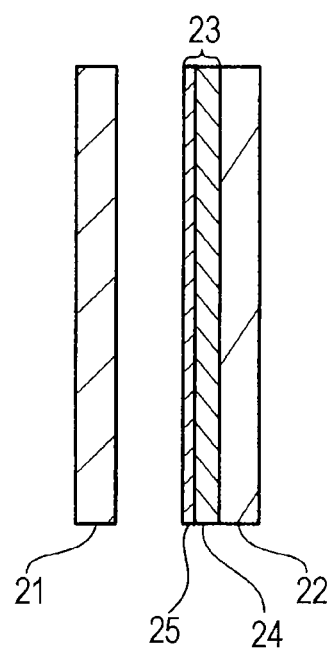
FIG. 10 is a schematic cross-sectional view showing an example of the structure of a display apparatus according to a fourth embodiment.
Figure 11:
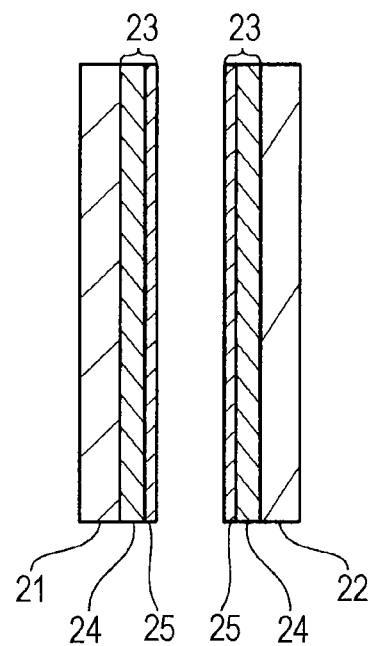
FIG. 11 is a schematic cross-sectional view showing an example of the structure of a display apparatus according to the fourth embodiment.

FIGS. 10 and 11 show examples of the structures of display apparatuses according to the fourth embodiment. Each of the display apparatuses includes a display unit 21 and a front surface member 22 provided at the front surface side of the display unit 21. For example, an air layer is formed between the display unit 21 and the front surface member 22. An ANR film 23 is provided on at least one of the front surface side of the display unit 21 and the rear surface side of the front surface member 22. Specifically, FIG. 10 shows an example of a display apparatus including an ANR film 23 on the rear surface side of the front surface member 22. On the other hand, FIG. 11 shows an example of a display apparatus including ANR films 23 both on the front surface side of the display unit 21 and on the rear surface side of the front surface member 22. From the standpoint of suppressing occurrence of Newton rings, ANR films 23 are preferably provided both on the display surface side of the display unit 21 and on the rear surface side of the front surface member 22. The ANR film 23 is bonded to the front surface member 22 or the display unit 21 with an adhesive agent or the like. The "front surface" is the surface serving as a display surface, i.e., the surface located at the viewer's side, and the "rear surface" is the surface opposite the display surface.

Examples of the display unit 21 that can be used include liquid crystal displays, cathode ray tube (CRT) displays, plasma display panels (PDPs), organic electroluminescence (EL) displays, inorganic EL displays, surface-conduction electron-emitter displays (SEDs), and field emission displays (FEDs).

The front surface member 22 is used for the purpose of providing mechanical, thermal, and weathering protections and a design function to the front surface (viewer's side) of the display unit 21. The front surface member 22 is, for example, sheet-shaped, film-shaped, or plate-shaped. Examples of the material for the front surface member 22 that can be used include, glass, triacetyl cellulose (TAC), polyesters (TPEE), polyethylene terephthalate (PET), polyimides (PI), polyamides (PA), aramids, polyethylene (PE), polyacrylates, polyethersulfone, polysulfone, polypropylene (PP), diacetyl cellulose, polyvinyl chloride, acrylic resins (PMMA), and polycarbonate (PC). However, the material is not particularly limited to these materials and any material having transparency can be used.

Figure 12:
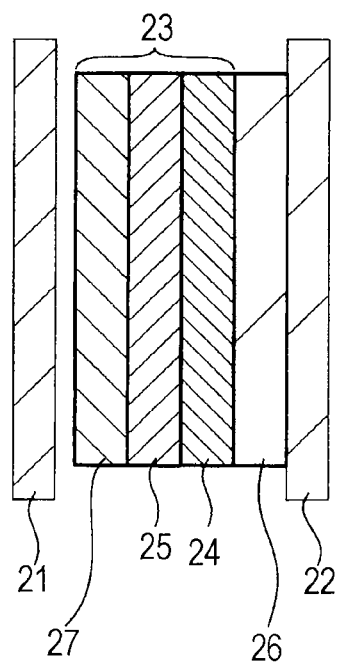
FIG. 12 is a schematic cross-sectional view showing one example of the structure of an ANR film according to the fourth embodiment.

FIG. 12 shows one example of the structure of an ANR film. An ANR film 23 suppresses occurrence of Newton rings in the display apparatus. As shown in FIG. 12, the ANR film 23 includes a base member 24 and an ANR layer 25 provided on the base member 24. The ANR film 23 is bonded onto an adherend such as a front surface member 22 with an adhesive layer 26 therebetween. The adhesive layer 26 contains an adhesive agent as a main component. For example, known adhesive agents used in the technical field of optical films can be used as the adhesive agent. It should be noted that, in this specification, tackiness agents such as pressure-sensitive adhesives (PSAs) are also considered as one type of adhesive agents.

A film identical to the antiglare film 1 in the first embodiment can be used as the ANR film 23. Specifically, the base member 24 and the ANR layer 25 identical to the base member 11 and the antiglare layer 12, respectively, in the first embodiment can be used.

In addition, as shown in FIG. 12, preferably, an anti-reflection (AR) layer 27 is further formed on the ANR layer 25 from the standpoint of reducing reflected light. The AR layer 27 may be either a dry-type layer or a wet-type layer, but is preferably a wet-type layer. Examples of the wet-type AR layer 27 include a layer containing a fluorine-based resin and a layer containing hollow fine particles such as silica.

According to the fourth embodiment, by arranging the ANR film 23 on at least one of the front surface side of the display unit 21 and the rear surface side of the front surface member 22, the occurrence of Newton rings can be suppressed or the occurrence of Newton rings can be reduced to a negligible level.

(5) Fifth Embodiment

Figure 13:
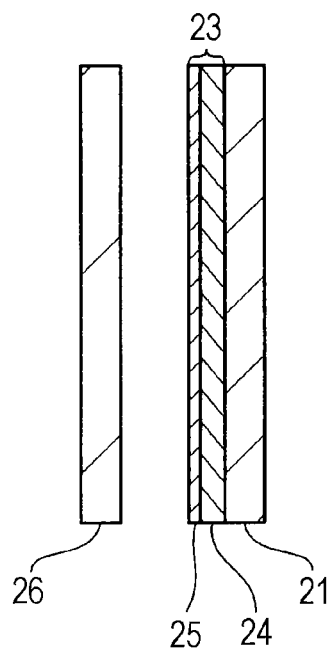
FIG. 13 is a schematic cross-sectional view showing an example of the structure of a display apparatus according to a fifth embodiment.
Figure 14:
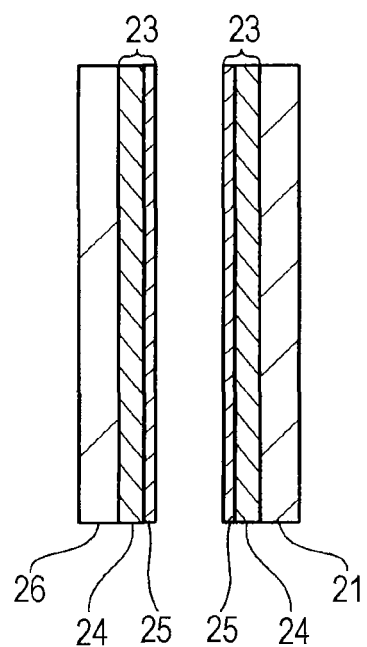
FIG. 14 is a schematic cross-sectional view showing an example of the structure of a display apparatus according to the fifth embodiment.

FIGS. 13 and 14 show examples of the structures of display apparatuses according to a fifth embodiment. This fifth embodiment differs from the fourth embodiment in that the display apparatus includes a display unit 21, a rear surface member 26 provided at the rear surface side of the display unit 21, and an ANR film 23 provided on at least one of the rear surface side of the display unit 21 and the front surface side of the rear surface member 26.

Specifically, FIG. 13 shows an example of a display apparatus including an ANR film 23 on the rear surface side of the display unit 21. On the other hand, FIG. 14 shows an example of a display apparatus including an ANR film 23 on the rear surface side of the display unit 21 and on the front surface side of the rear surface member 26, respectively. Note that the same components as the fourth embodiment are assigned the same reference characters and a description thereof is omitted.

The rear surface member 26 is, for example, sheet-shaped, film-shaped, or plate-shaped. When the display unit is a liquid crystal display, the rear surface member 26 is, for example, a diffusing plate or diffusing sheet that makes the illuminance of light emitted from a light source uniform in a plane, a lens film for controlling the viewing angle, a polarization separation reflection film that polarizes and separates light from the light source for reuse, or the like.

According to this fifth embodiment, by arranging the ANR film 23 on at least one of the rear surface side of the display unit 21 and the front surface side of the rear surface member 26, the occurrence of Newton rings can be suppressed or the occurrence of Newton rings can be reduced to a negligible level.

(6) Sixth Embodiment

Figure 15:
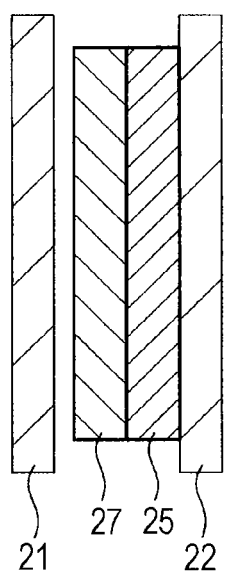
FIG. 15 is a schematic cross-sectional view showing one example the structure of a display apparatus according to a sixth embodiment.

FIG. 15 shows one example of the structure of a display apparatus according to a sixth embodiment. This sixth embodiment differs from the fourth embodiment in that an ANR layer 25 is formed directly on at least one of the front surface side of the display unit 21 and the rear surface side of the front surface member 22 without using an adhesive agent or the like. FIG. 15 shows an example in which the ANR layer 25 is formed directly on the rear surface side of the front surface member 22. The same components as the fourth embodiment are assigned the same reference characters and a description thereof is omitted.

Note that, also in the fifth embodiment, the ANR layer 25 may be formed directly on at least one of the rear surface side of the display unit 21 and the front surface side of the rear surafce member 26.

According to the sixth embodiment, since the ANR layer 25 is formed directly on at least one of the front surface side of the display unit 21 and the rear surface side of the front surface member 22, the structure and the production process of the display apparatus can be simplified compared with the fourth embodiment.

EXAMPLES

The embodiments will now be specifically described by way of Examples, but the embodiments are not limited to only these Examples.

In Examples, the average particle diameter of fine particles and the dry film thickness of an antiglare layer were measured as follows.

(Average Particle Diameter of Fine Particles)

The average particle diameter of fine particles was determined by measuring the particle diameter with a Coulter Multisizer and averaging the obtained data.

(Dry Film Thickness of Antiglare Layer)

The dry film thickness (average film thickness) of the antiglare layer was determined with a contact thickness meter (produced by TESA K.K.) as follows. A cylindrical probe having a diameter of 6 mm was used as a contact probe. First, the cylindrical probe was brought into contact with the antiglare layer at such a low load that the antiglare layer is not broken. Next, measurement was performed at arbitrary five points to determine the average value $D_A$ of the total thickness of the antiglare film. Furthermore, the thickness of an uncoated portion of the same base member was measured to determine the thickness $D_B$ of the base member. The value calculated by subtracting the thickness $D_B$ of the base member from the average value $D_A$ was defined as the thickness of the antiglare layer. In the case where such an uncoated portion cannot be obtained, the thickness of the base member can be measured by preparing a cross section of the antiglare film by a microtome technique or the like. However, since the thickness thus measured is a microscopic film thickness, it is preferable to determine the film thickness as the average film thickness as described in the former method.

Example 1

First, the materials shown in the coating material composition below were blended, and the resulting mixture was stirred for two hours to obtain a coating material. Next, the obtained coating material was applied onto a TAC film (produced by Fujifilm Corporation) having a thickness of 80 µm with a die coater at a rate of 20 m/min. Next, the resulting film was dried in a drying oven at 80° C. for two minutes and then irradiated with ultraviolet rays at 500 mJ/cm$^2$ to form an antiglare layer having a dry film thickness of 10.9 µm. Thus, an optical film of Example 1 was obtained.

<Coating Material Composition>
Hexafunctional urethane acrylic oligomer 90 parts by weight
  Acrylic-based polymer 10 parts by weight
  Initiator Irgacure 184 5 parts by weight
  Solvent Butyl acetate 65 parts by weight
  Dimethyl carbonate 53 parts by weight
  Silicon-based leveling agent 0.05 parts by weight
  Cross-linking MS beads (Techpolymer produced by Sekisui Plastics Co., Ltd., refractive index 1.515, average particle diameter 5.5 µm, coefficient of variation 7) 12.5 parts by weight Example 2

An optical film of Example 2 was obtained as in Example 1 except that the dry film thickness was controlled to be 11.6 µm by adjusting the die gap, the flow rate of the coating material being supplied, and the back pressure.

Example 3

An optical film of Example 3 was obtained as in Example 1 except that the dry film thickness was controlled to be 12.8 µm by adjusting the die gap, the flow rate of the coating material being supplied, and the back pressure.

Example 4

An optical film of Example 4 was obtained as in Example 1 except that the dry film thickness was controlled to be 14.4 µm by adjusting the die gap, the flow rate of the coating material being supplied, and the back pressure.

Example 5

An optical film of Example 5 was obtained as in Example 1 except that the dry film thickness was controlled to be 16.3 µm by adjusting the die gap, the flow rate of the coating material being supplied, and the back pressure.

Example 6

An optical film of Example 6 having a dry film thickness of 13.0 µm was obtained by die coating as in Example 1 except that the coating material composition described below was used.

<Coating Material Composition>
Hexafunctional urethane acrylic oligomer 97 parts by weight
  Acrylic-based polymer 3 parts by weight
  Initiator Irgacure 184 5 parts by weight
  Solvent Butyl acetate 65 parts by weight
  Dimethyl carbonate 53 parts by weight
  Silicon-based leveling agent 0.05 parts by weight
  Cross-linking MS beads (Techpolymer produced by Sekisui Plastics Co., Ltd., refractive index 1.515, average particle diameter 5.5 µm, coefficient of variation 7) 12.5 parts by weight Example 7

An optical film of Example 7 was obtained as in Example 1 except that the film formation rate was controlled to be 30 m/min, and the dry film thickness was controlled to be 10.2 µm by adjusting the die gap, the flow rate of the coating material being supplied, and the back pressure.

Example 8

An optical film of Example 8 having a dry film thickness of 10.2 µm was obtained by die coating as in Example 1 except that the coating material composition described below was used and the application rate was controlled to be 30 m/min.

<Coating Material Composition>
Hexafunctional urethane acrylic oligomer 87 parts by weight
  Acrylic polyol-based polymer 13 parts by weight
  Initiator Irgacure 184 5 parts by weight
  Solvent Butyl acetate 65 parts by weight
  Dimethyl carbonate 53 parts by weight
  Silicon-based leveling agent 0.05 parts by weight
  Cross-linking MS beads (Techpolymer produced by Sekisui Plastics Co., Ltd., refractive index 1.515, average particle diameter 5.5 µm, coefficient of variation 7) 20 parts by weight

Example 9

An optical film of Example 9 was obtained as in Example 8 except that the dry film thickness was controlled to be 9.4 µm by adjusting the die gap, the flow rate of the coating material being supplied, and the back pressure.

Example 10

An optical film of Example 10 having a dry film thickness of 14.3 µm was obtained by die coating as in Example 1 except that the coating material composition described below was used.
<Coating Material Composition>
Hexafunctional urethane acrylic oligomer 82 parts by weight
Acrylic-based polymer 18 parts by weight
Initiator Irgacure 184 5 parts by weight
Solvent Butyl acetate 65 parts by weight
Dimethyl carbonate 53 parts by weight
Silicon-based leveling agent 0.05 parts by weight
Cross-linking MS beads (Techpolymer produced by Sekisui Plastics Co., Ltd., refractive index 1.515, average particle diameter 5.5 µm, coefficient of variation 7) 25 parts by weight

Example 11

An optical film of Example 11 having a dry film thickness of 14.1 µm was obtained by die coating as in Example 1 except that the coating material composition described below was used.
<Coating Material Composition>
Hexafunctional urethane acrylic oligomer 82 parts by weight
Acrylic polyol-based polymer 18 parts by weight
Initiator Irgacure 184 5 parts by weight
Solvent Butyl acetate 65 parts by weight
Dimethyl carbonate 53 parts by weight
Fluorine-based leveling agent 0.5 parts by weight
Cross-linking MS beads (Techpolymer produced by Sekisui Plastics Co., Ltd., refractive index 1.515, average particle diameter 5.5 µm, coefficient of variation 7) 25 parts by weight

Example 12

First, the materials shown in the coating material composition below were blended, and the resulting mixture was stirred for two hours to obtain a coating material. Next, the obtained coating material was applied onto a TAC film (produced by Fujifilm Corporation) having a thickness of 80 µm with a micro-gravure coater with 80 lines at a rate of 30 m/min. Next, the resulting film was dried in a drying oven at 80° C. for two minutes and then irradiated with ultraviolet rays at 500 mJ/cm$^2$ to form an antiglare layer having a dry film thickness of 22.3 µm. Thus, an optical film of Example 12 was obtained.
<Coating Material Composition>
Hexafunctional urethane acrylic oligomer 87 parts by weight
Acrylic polyol-based polymer 13 parts by weight
Initiator Irgacure 184 5 parts by weight
Solvent Butyl acetate 59 parts by weight
Dimethyl carbonate 49 parts by weight
Silicon-based leveling agent 0.05 parts by weight
Cross-linking MS beads (Techpolymer produced by Sekisui Plastics Co., Ltd., refractive index 1.515, average particle diameter 5.5 µm, coefficient of variation 7) 27.5 parts by weight

Example 13

First, the materials shown in the coating material composition below were blended, and the resulting mixture was stirred with a magnetic stirrer for one hour to obtain a coating material. Next, the obtained coating material was applied onto a TAC film (produced by Fujifilm Corporation) having a thickness of 80 µm with a wire bar coater. Next, the resulting film was dried in a drying oven at 80° C. for two minutes and then irradiated with ultraviolet rays at 500 J/cm$^2$ to form an antiglare layer having a dry film thickness of 17.2 µm. Thus, an optical film of Example 13 was obtained.
<Coating Material Composition>
Hexafunctional urethane acrylic oligomer 87 parts by weight
Acrylic polyol-based polymer 13 parts by weight
Initiator Irgacure 184 5 parts by weight
Solvent Butyl acetate 59 parts by weight
Dimethyl carbonate 49 parts by weight
Silicon-based leveling agent 0.05 parts by weight
Cross-linking MS beads (Techpolymer produced by Sekisui Plastics Co., Ltd., refractive index 1.525, average particle diameter 5.0 µm, coefficient of variation 7) 27.5 parts by weight

Example 14

An optical film of Example 14 having a dry film thickness of 15.3 µm was obtained with a wire bar coater as in Example 13 except that the coating material composition described below was used.
<Coating Material Composition>
Hexafunctional urethane acrylic oligomer 87 parts by weight
Acrylic polyol-based polymer 13 parts by weight
Initiator Irgacure 184 5 parts by weight
Solvent Butyl acetate 59 parts by weight
Dimethyl carbonate 49 parts by weight
Silicon-based leveling agent 0.05 parts by weight
Cross-linking MS beads (Techpolymer produced by Sekisui Plastics Co., Ltd., refractive index 1.505, average particle diameter 5.0 µm, coefficient of variation 8) 27.5 parts by weight

Example 15

An optical film of Example 15 having a dry film thickness of 14.6 µm was obtained with a wire bar coater as in Example 13 except that the coating material composition described below was used.
<Coating Material Composition>
Hexafunctional urethane acrylic oligomer 87 parts by weight
Acrylic polyol-based polymer 13 parts by weight
Initiator Irgacure 184 5 parts by weight
Solvent Butyl acetate 59 parts by weight
Dimethyl carbonate 49 parts by weight
Silicon-based leveling agent 0.05 parts by weight
Cross-linking MS beads (Techpolymer produced by Sekisui Plastics Co., Ltd., refractive index 1.505, average particle diameter 5.0 µm, coefficient of variation 8) 37.5 parts by weight

Example 16

An optical film of Example 16 having a dry film thickness of 14.1 μm was obtained with a wire bar coater as in Example 13 except that the coating material composition described below was used.

<Coating Material Composition>
Hexafunctional urethane acrylic oligomer 87 parts by weight
  Acrylic polyol-based polymer 13 parts by weight
  Initiator Irgacure 184 5 parts by weight
  Solvent Butyl acetate 59 parts by weight
  Dimethyl carbonate 49 parts by weight
  Silicon-based leveling agent 0.05 parts by weight
  Cross-linking MS beads (Techpolymer produced by Sekisui Plastics Co., Ltd., refractive index 1.505, average particle diameter 5.0 μm, coefficient of variation 8) 42.5 parts by weight

Example 17

First, the materials shown in the coating material composition below were blended, and the resulting mixture was stirred for two hours to obtain a coating material. Next, the obtained coating material was applied onto a TAC film (produced by Fujifilm Corporation) having a thickness of 80 μm with a micro-gravure coater with 100 lines at a rate of 30 m/min. Next, the resulting film was dried in a drying oven at 80° C. for two minutes and then irradiated with ultraviolet rays at 500 mJ/cm$^2$ to form an antiglare layer having a dry film thickness of 11.5 μm. Thus, an optical film of Example 17 was obtained.

<Coating Material Composition>
Hexafunctional urethane acrylic oligomer 80 parts by weight
  Acrylic-based polymer 20 parts by weight
  Initiator Irgacure 184 5 parts by weight
  Solvent Butyl acetate 65 parts by weight (NV60)
  Dimethyl carbonate 53 parts by weight
  Silicon-based leveling agent 0.05 parts by weight
  Cross-linking MS beads (Techpolymer produced by Sekisui Plastics Co., Ltd., refractive index 1.515, average particle diameter 5.5 μm, coefficient of variation 7) 25 parts by weight

Example 18

An optical film of Example 18 having a dry film thickness of 10.5 μm was obtained by die coating as in Example 1 except that the coating material composition described below was used.

<Coating Material Composition>
Hexafunctional urethane acrylic oligomer 90 parts by weight
  Acrylic-based polymer 10 parts by weight
  Initiator Irgacure 184 5 parts by weight
  Solvent Butyl acetate 65 parts by weight (NV50)
  Dimethyl carbonate 53 parts by weight
  Silicon-based leveling agent 0.05 parts by weight
  Cross-linking MS beads (Techpolymer produced by Sekisui Plastics Co., Ltd., refractive index 1.515, average particle diameter 5.5 μm, coefficient of variation 7) 10.0 parts by weight

Example 19

First, the materials shown in the coating material composition below were blended, and the resulting mixture was stirred for two hours to obtain a coating material. Next, the obtained coating material was applied onto a TAC film (produced by Fujifilm Corporation) having a thickness of 80 μm with a die coater at a rate of 20 m/min. Next, the resulting film was dried in a drying oven at 80° C. for two minutes and then irradiated with ultraviolet rays at 500 mJ/cm$^2$ to form an antiglare layer having a dry film thickness of 11.7 μm. Thus, an optical film of Example 19 was obtained.

<Coating Material Composition>
Hexafunctional urethane acrylic oligomer 90 parts by weight
  Acrylic-based polymer 10 parts by weight
  Initiator Irgacure 184 5 parts by weight
  Solvent Butyl acetate 65 parts by weight
  Dimethyl carbonate 53 parts by weight
  Silicon-based leveling agent 0.05 parts by weight
  Cross-linking MS beads (Techpolymer produced by Sekisui Plastics Co., Ltd., refractive index 1.525, average particle diameter 5.0 μm, coefficient of variation 7) 10.0 parts by weight

Example 20

An optical film of Example 20 was obtained as in Example 19 except that the dry film thickness was controlled to be 13.0 μm by adjusting the die gap, the flow rate of the coating material being supplied, and the back pressure.

Example 21

An optical film of Example 21 having a dry film thickness of 11.8 μm was obtained by die coating as in Example 1 except that the coating material composition described below was used.

<Coating Material Composition>
Hexafunctional urethane acrylic oligomer 90 parts by weight
  Acrylic-based polymer 10 parts by weight
  Initiator Irgacure 184 5 parts by weight
  Solvent Butyl acetate 65 parts by weight
  Dimethyl carbonate 53 parts by weight
  Silicon-based leveling agent 0.05 parts by weight
  Cross-linking MS beads (Techpolymer produced by Sekisui Plastics Co., Ltd., refractive index 1.505, average particle diameter 5.0 μm, coefficient of variation 8) 10.0 parts by weight

Example 22

First, an antiglare film was obtained as in Example 18 except that the dry film thickness was controlled to be 13.6 μm by adjusting the die gap, the flow rate of the coating material being supplied, and the back pressure. Next, a low-refractive-index coating material containing hollow silica was applied onto the obtained antiglare film with a micro-gravure coater with 120 lines at an application rate of 20 m/min. Next, the resulting film was dried in a drying oven at 80° C. for two minutes and then cured by being irradiated with ultraviolet rays at 500 mJ/cm$^2$ to form a low-refractive-index layer (anti-reflection coating) having a dry film thickness of 120 nm on the antiglare layer. Thus, an optical film of Example 22 was obtained.

Example 23

First, an antiglare film was obtained as in Example 19 except that the dry film thickness was controlled to be 8.8 μm by adjusting the die gap, the flow rate of the coating material being supplied, and the back pressure. Next, a low-refractive-index coating material containing hollow silica was applied onto the obtained antiglare film with a micro-gravure coater with 120 lines at an application rate of 20 m/min. Next, the resulting film was dried in a drying oven at 80° C. for two minutes and then cured by being irradiated with ultraviolet rays at 500 mJ/cm$^2$ to form a low-refractive-index layer (antireflection coating) having a dry film thickness of 120 nm on the antiglare layer. Thus, an optical film of Example 23 was obtained.

Example 24

An optical film of Example 24 having a dry film thickness of 13.5 μm was obtained with a wire bar coater as in Example 13 except that the coating material composition described below was used.
<Coating Material Composition>
Hexafunctional urethane acrylic oligomer 95 parts by weight
Acrylic polyol-based polymer 5 parts by weight
Initiator Irgacure 184 5 parts by weight
Solvent Toluene 89 parts by weight
Dimethyl carbonate 73 parts by weight
Cross-linking MS beads (Techpolymer produced by Sekisui Plastics Co., Ltd., refractive index 1.515, average particle diameter 5.0 μm, coefficient of variation 7) 27.5 parts by weight Example 25

An optical film of Example 25 was obtained as in Example 24 except that the dry film thickness was controlled to be 15.4 μm.

Example 26

An optical film of Example 26 was obtained as in Example 24 except that the dry film thickness was controlled to be 17.3 μm.

Comparative Example 1

First, the materials shown in the coating material composition below were blended, and the resulting mixture was stirred for two hours to obtain a coating material. Next, the obtained coating material was applied onto a TAC film (produced by Fujifilm Corporation) having a thickness of 80 μm with a micro-gravure coater with 80 lines at a rate of 20 m/min. Next, the resulting film was dried in a drying oven at 80° C. for two minutes and then irradiated with ultraviolet rays at 500 mJ/cm$^2$ to form an antiglare layer having a dry film thickness of 6.1 μm. Thus, an optical film of a Comparative Example 1 was obtained.
<Coating Material Composition>
Hexafunctional urethane acrylic oligomer 95 parts by weight
Acrylic polyol-based polymer 5 parts by weight
Initiator Irgacure 184 5 parts by weight
Solvent Butyl acetate 57 parts by weight
Dimethyl carbonate 47 parts by weight
Silicon-based leveling agent 0.05 parts by weight
Cross-linking MS beads (Techpolymer produced by Sekisui Plastics Co., Ltd., refractive index 1.560, average particle diameter 5.2 μm, coefficient of variation 31) 7.5 parts by weight Comparative Example 2

An optical film of Comparative Example 2 was obtained as in Comparative Example 1 except that the dry film thickness was controlled to be 7.4 μm by adjusting the peripheral speed ratio of the gravure.

Comparative Example 3

An optical film of Comparative Example 3 was obtained as in Example 1 except that the dry film thickness was controlled to be 7.3 μm by adjusting the die gap, the flow rate of the coating material being supplied, and the back pressure.

Comparative Example 4

First, the materials shown in the coating material composition below were blended, and the resulting mixture was stirred for two hours to obtain a coating material. Next, the obtained coating material was applied onto a TAC film (produced by Fujifilm Corporation) having a thickness of 80 μm with a micro-gravure coater with 90 lines at a rate of 30 m/min. Next, the resulting film was dried in a drying oven at 80° C. for two minutes and then irradiated with ultraviolet rays at 500 mJ/cm$^2$ to form an antiglare layer having a dry film thickness of 13.7 μm. Thus, an optical film of Comparative Example 4 was obtained.
<Coating Material Composition>
Hexafunctional urethane acrylic oligomer 100 parts by weight
Initiator Irgacure 184 5 parts by weight
Solvent Butyl acetate 65 parts by weight (NV50)
Dimethyl carbonate 53 parts by weight
Silicon-based leveling agent 0.05 parts by weight
Cross-linking MS beads (Techpolymer produced by Sekisui Plastics Co., Ltd., refractive index 1.515, average particle diameter 5.5 μm, coefficient of variation 7) 27.5 parts by weight Comparative Example 5

An optical film of Comparative Example 5 having a dry film thickness of 11.9 μm was obtained with a wire bar coater as in Example 13 except that the coating material composition described below was used.
<Coating Material Composition>
Hexafunctional urethane acrylic oligomer 75 parts by weight
Acrylic-based polymer 25 parts by weight
Initiator Irgacure 184 5 parts by weight
Solvent Butyl acetate 139 parts by weight (NV45)
Dimethyl carbonate 20 parts by weight
Silicon-based leveling agent 0.05 parts by weight
Cross-linking MS beads (Techpolymer produced by Sekisui Plastics Co., Ltd., refractive index 1.515, average particle diameter 5.5 μm, coefficient of variation 7) 27.5 parts by weight Comparative Example 6

An optical film of Comparative Example 6 having a dry film thickness of 13.5 μm was obtained with a wire bar coater as in Example 13 except that the coating material composition described below was used.

<Coating Material Composition>

Hexafunctional urethane acrylic oligomer 87 parts by weight

Acrylic polyol-based polymer 13 parts by weight

Initiator Irgacure 184 5 parts by weight

Solvent Butyl acetate 59 parts by weight (NV55)

Dimethyl carbonate 49 parts by weight

Silicon-based leveling agent 0.05 parts by weight

Cross-linking acrylic beads (Techpolymer produced by Sekisui Plastics Co., Ltd., refractive index 1.495, average particle diameter 5 μm, coefficient of variation 8) 27.5 parts by weight The glossiness, opacity, occurrence or non-occurrence of curling, image clarity, haze, state of fine particles, antiglare property, occurrence or non-occurrence of Newton rings, and glare of the antiglare films of Examples and Comparative Examples were evaluated as follows.

(Glossiness)

The glossiness of the antiglare films of Examples and Comparative Examples was measured as follows. In order to suppress the influence of rear surface reflection and to evaluate the glossiness the antiglare films, each of the prepared antiglare films was bonded to a black acrylic plate (Acrylite L 502 produced by Mitsubishi Rayon Co., Ltd.) having a thickness of 3 mm with an optical tackiness agent having a haze of 0.5% or less. The glossiness was measured with a Micro-Tri-Gloss produced by BYK-Gardner Inc. The results are shown in Table 1.

Figure 16:
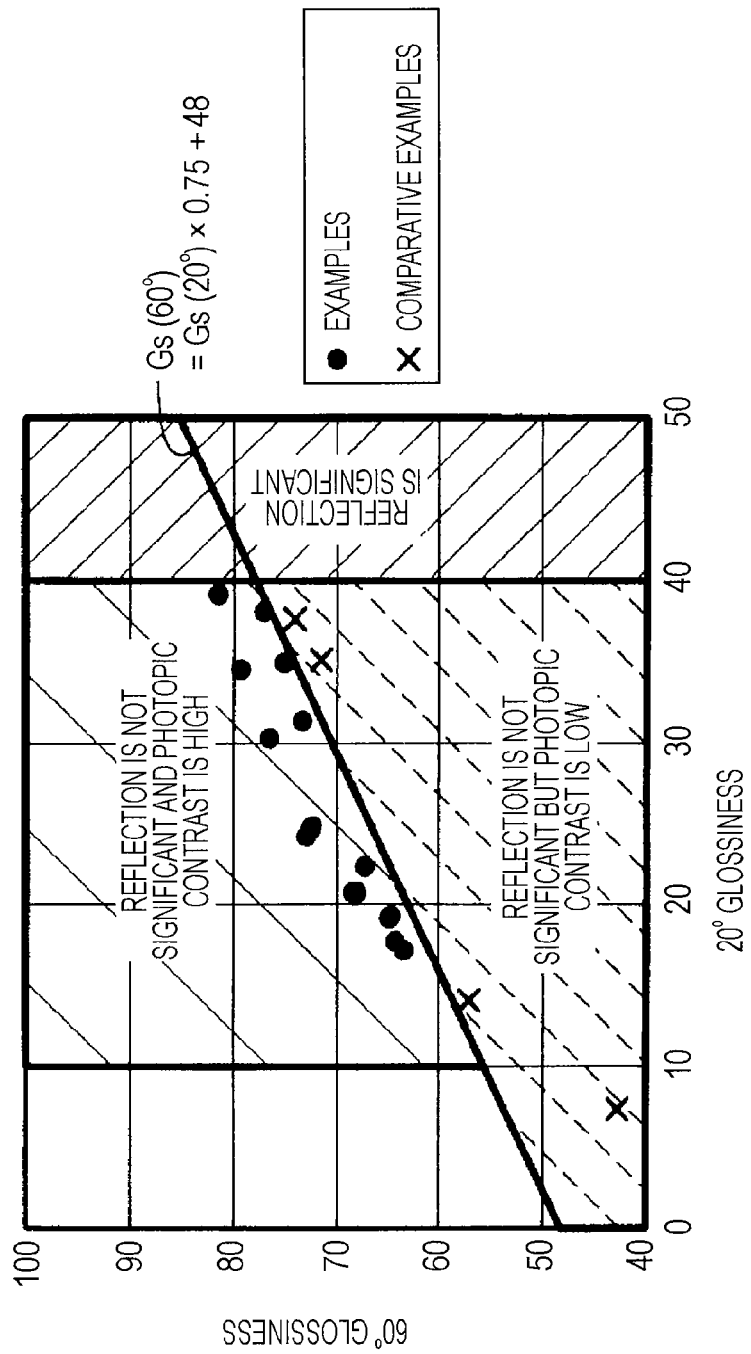
FIG. 16 is a graph showing the relationship between the 20° glossiness and the 60° glossiness of antiglare films of Examples 1 to 16 and Comparative Examples 1 to 4.

In addition, FIG. 16 shows the relationship between the 20° glossiness and the 60° glossiness of the antiglare films of Examples 1 to 16 and Comparative Examples 1 to 4.

Figure 17:
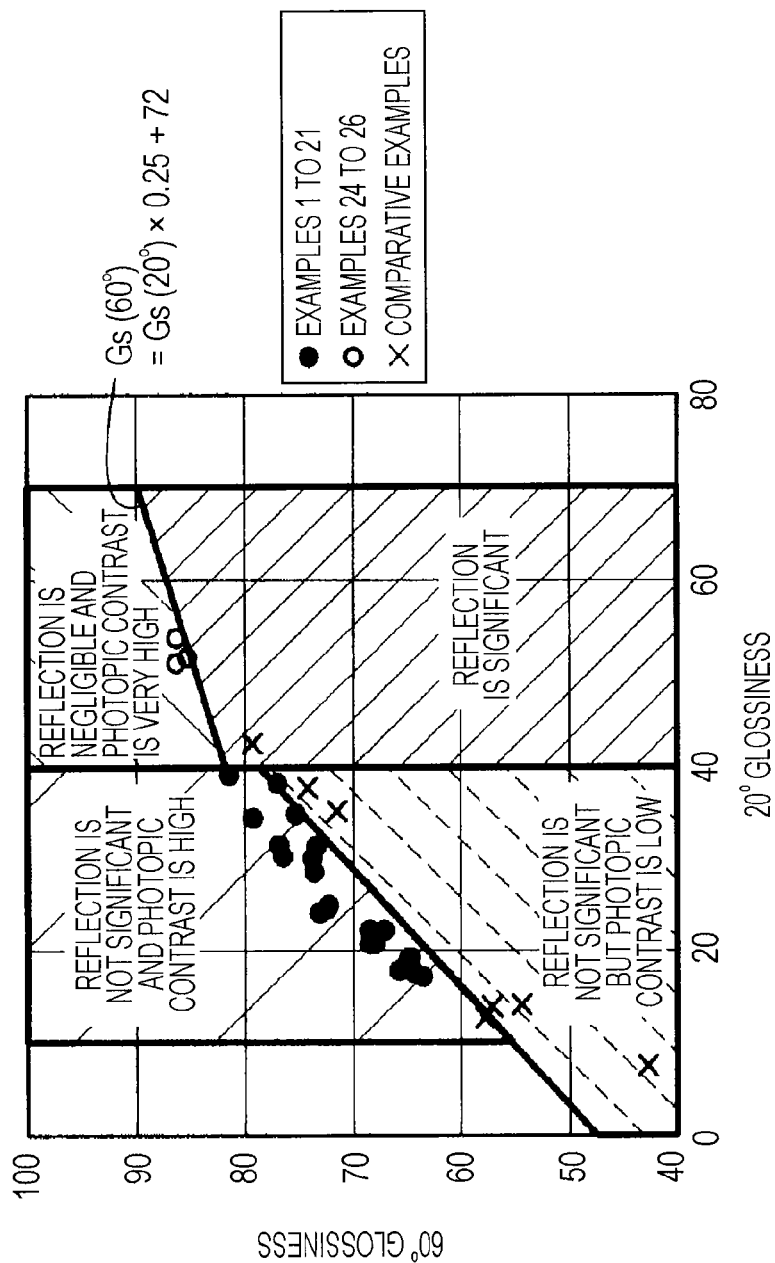
FIG. 17 is a graph showing the relationship between the 20° glossiness and the 60° glossiness of antiglare films of Examples 1 to 21, Examples 24 to 26, and Comparative Examples 1 to 7.
Figure 18:
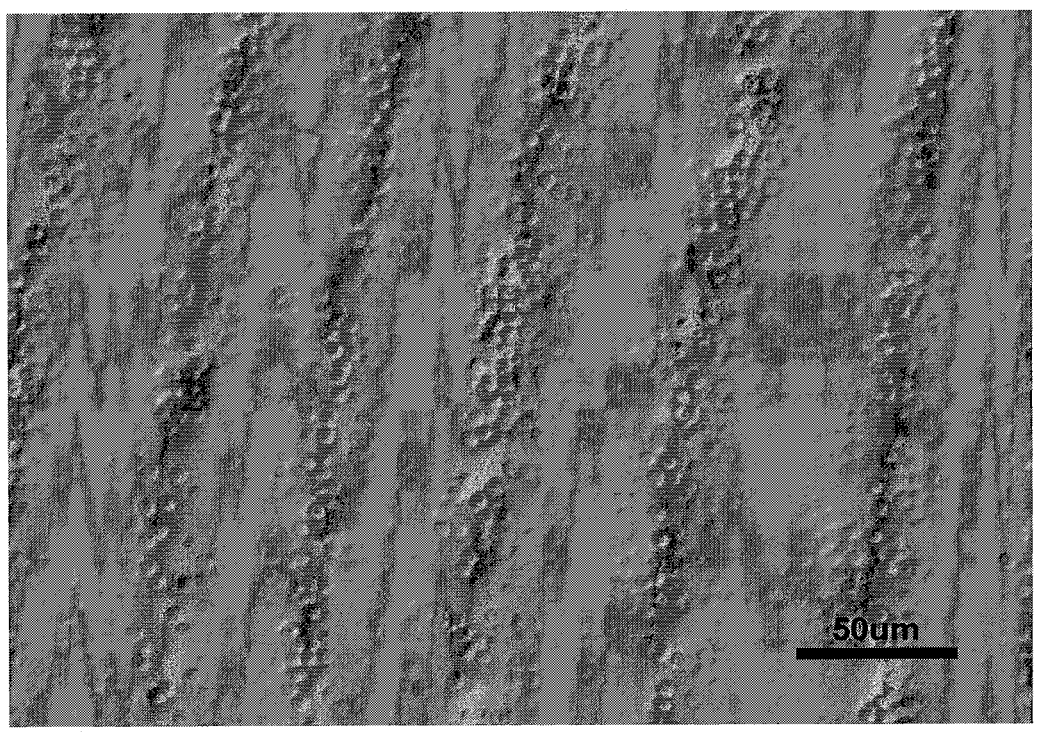
FIG. 18 is a transmission differential interference image of the antiglare film of Example 1.
Figure 19:
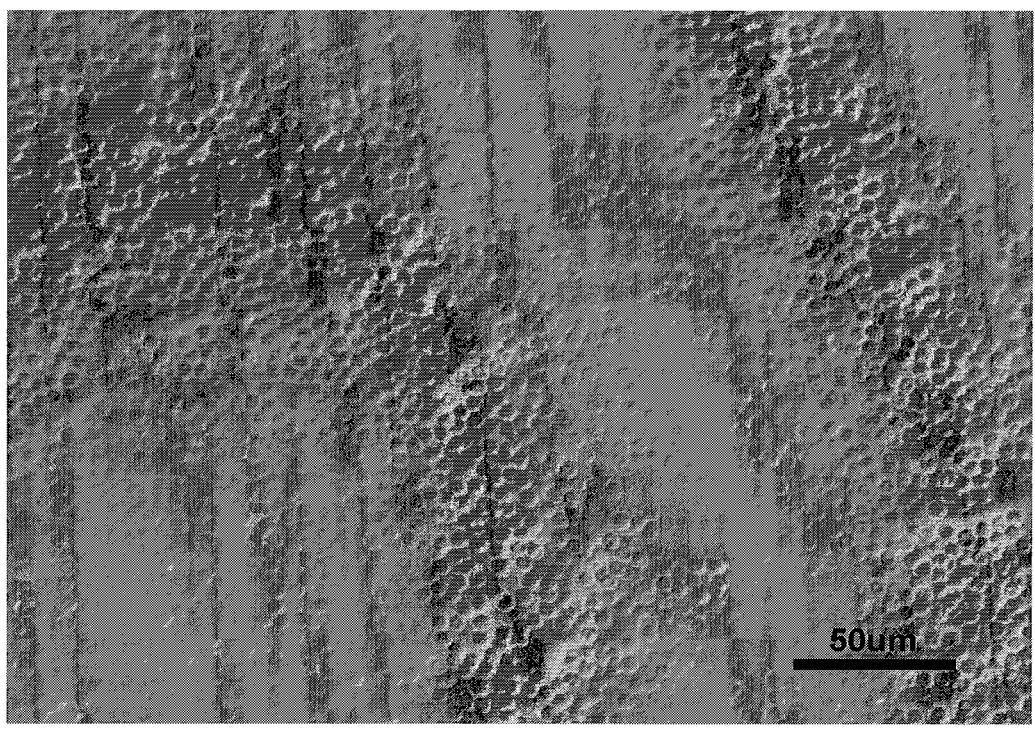
FIG. 19 is a transmission differential interference image of the antiglare film of Example 10.
Figure 20:
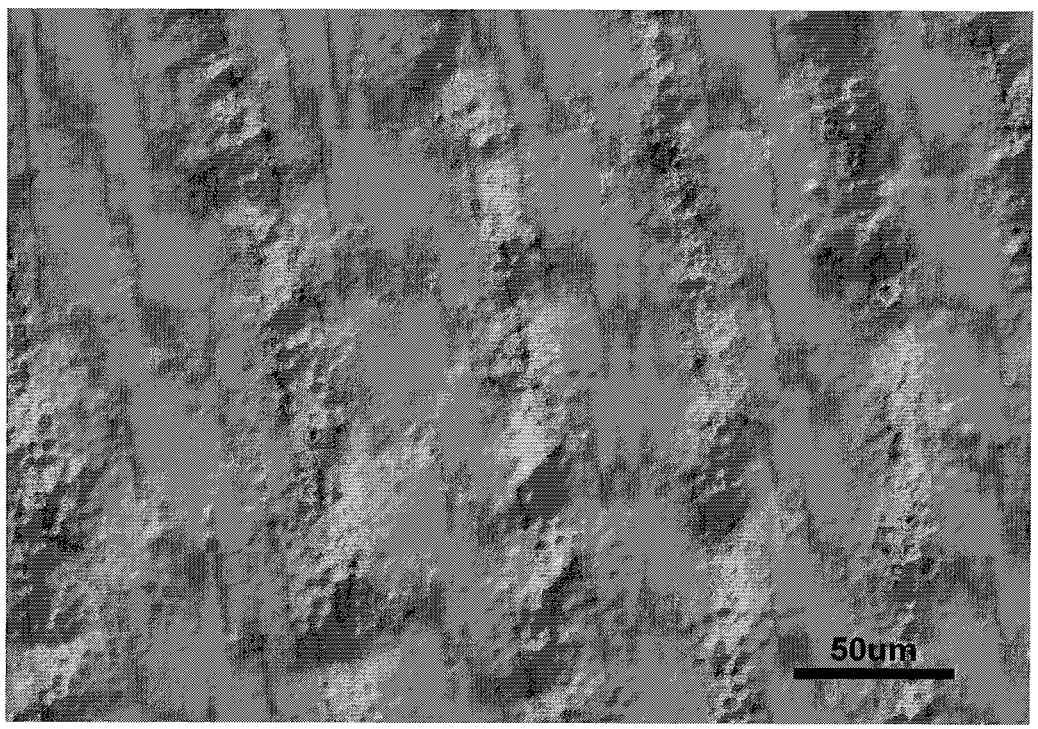
FIG. 20 is a transmission differential interference image of the antiglare film of Comparative Example 5.
Figure 21:
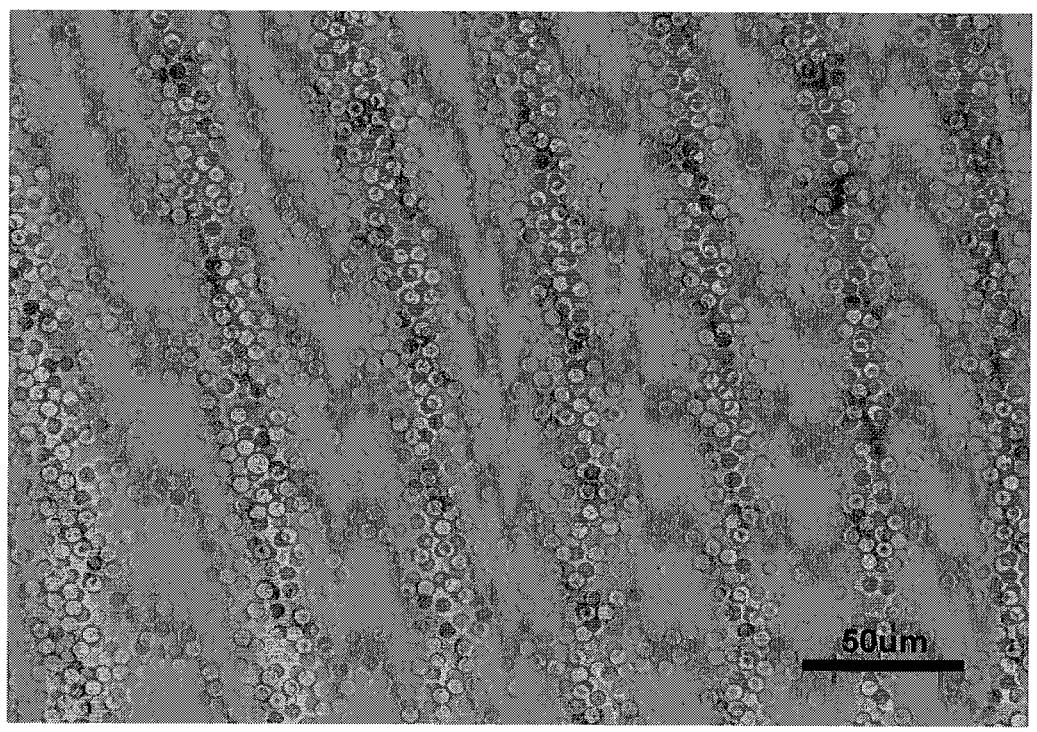
FIG. 21 is a transmission differential interference image of the antiglare film of Comparative Example 6.

In addition, FIG. 17 shows the relationship between the 20° glossiness and the 60° glossiness of the antiglare films of Examples 1 to 21, Examples 24 to 26, and Comparative Examples 1 to 7.

(Opacity)

The opacity of the antiglare films of Examples and Comparative Examples was measured. The results are shown in Table 1. The feeling of opacity is felt when reflected light diffused at the surface of the antiglare layer is sensed. Here, a commercially available spectrocolorimeter was used, the phenomenon described above was generated by a simulation, and the quantified values were defined as the opacity. Note that, it was confirmed by experiments that the opacity measured here is correlated with the feeling of opacity that is visually observed.

The specific method for measuring the opacity will be described below. First, in order to suppress the influence of rear surface reflection and to evaluate diffuse reflection of the antiglare film itself, a black acrylic plate (Acrylite L 502 produced by Mitsubishi Rayon Co., Ltd.) was bonded to the rear surface of the prepared antiglare film with a tackiness agent therebetween. Next, measurement was performed with an integrating sphere spectrocolorimeter SP64 produced by X-Rite Inc. using a D65 light source in a d/8° optical system in which diffused light is applied to a surface of a sample and the reflected light is measured with a detector located at a position slanted at an angle of 8° with respect to the normal line direction of the sample. The SPEX mode in which specular reflection components are removed and only the diffuse reflection components are detected was used for the measured values, and the measurement was carried out at a detection viewing angle of 2°.

(Occurrence or Non-Occurrence of Curling)

For the respective antiglare films of Examples and Comparative Examples, occurrence or non-occurrence of curling of the antiglare films was determined on the basis of the following standard.

⊙: The problem of curling hardly occurred.

○: Curling occurred to some degree. However, the antiglare film could be formed into a polarizing plate with careful operation even when a special line was not prepared for a subsequent step.

Δ: Curling significantly occurred. However, the antiglare film could be formed into a polarizing plate by constructing a special line equipped with a pass-roll that can correct the curling as a line for forming a polarizing plate in the subsequent step.

(Image Clarity)

To evaluate the transmission clarity of fine-pitch images of each of the antiglare films of Examples and Comparative Examples, the transmitted image clarity was evaluated in accordance with JIS-K7105 using optical combs having a comb width of 2 mm, 1 mm, 0.5 mm, 0.25 mm, and 0.125 mm. The results are shown in Table 2. The measuring device used for the evaluation was an image clarity measuring device (model: ICM-1T) produced by Suga Test Instruments Co., Ltd.

Table 2 shows a ratio C(0.125)/C(2.0) of the value C(0.125) at a 0.125-mm comb width to the value C(2.0) at a 2-mm comb width. The sum of the transmitted image clarity measured with optical combs having a comb width of 2 mm, 1 mm, 0.5 mm, and 0.125 mm are also shown.

(Haze)

The surface haze and the internal haze of the antiglare films of Examples and Comparative Examples were measured. The results are shown in Table 2. Note that the total haze is the sum of the surface haze and the internal haze.

Evaluation instrument: Haze meter, Model HM-150 produced by Murakami Color Research Laboratory Co., Ltd.

Evaluation condition: JIS K7136

In order to divide the haze of the optical films of Examples into the internal haze and the surface haze, a TAC film was bonded to a surface of each of the films with an optical tackiness agent therebetween to measure the haze. Note that the measured value was larger than the haze of the optical film of Example alone, but the reason for this is not clear. Accordingly, although the surface haze was negative values in terms of calculation, the negative surface haze was considered to be zero in Examples. Note that it was confirmed that the haze of a TAC with another TAC bonded on a surface thereof with an optical tackiness agent therebetween was 0.5% or less.

(State of Fine Particles)

The state of the distribution of organic fine particles was observed by optical microscopy. The results are shown in Table 2. It should be noted that when organic fine particles are distributed densely in some regions and sparsely in other regions, the optical films are evaluated as "○", and when organic fine particles are not distributed in such a manner that the particles are distributed densely in some regions and sparsely in other regions, and the particles are uniformly distributed, the optical films are evaluated as "×".

Furthermore, among Examples 1 to 26 and Comparative Examples 1 to 6, transmission differential interference images of the antiglare films of Examples 1 and 10 and Comparative Examples 5 and 6 are shown in FIGS. 18 to 21, respectively, as representative examples.

(Antiglare Property)

For each of the optical films of Examples 1 to 26 and Comparative Examples 1 to 6, in order to suppress the influence of rear surface reflection and to evaluate an antiglare property of the optical film itself, the rear surface of each optical film was bonded to a black acrylic plate (Acrylite L 502 produced by Mitsubishi Rayon Co., Ltd.) with a tackiness agent therebetween. Subsequently, the antiglare property was evaluated by the following two methods. In a first method, a reflected image of a viewer was observed from a distance of 50 cm in an ambient illuminance of 300 lux, and whether the viewer could find where they were looking at was evaluated. In a second method, an image reflected at each antiglare film was visually observed from a direction of specular reflection using, as a light source, two bare fluorescent lamps arranged in parallel, and occurrence or non-occurrence of reflection of the fluorescent lamps was evaluated.

A: The viewer could not find where they were looking at, and the image was blurred to an extent that the two fluorescent lamps were viewed as one fluorescent lamp.

B: The viewer could not find where they were looking at. The two fluorescent lamps were recognized but their contours were blurred.

C: The viewer could not find where they were looking at, but the contours of the fluorescent lamps were recognized.

D: The viewer could find where they were looking at, and the contours of the fluorescent lamps were also reflected as they were.

(Occurrence or Non-Occurrence of Newton Rings)

For each of the optical films of Examples 19 and 23 and Comparative Examples 1 and 7, occurrence or non-occurrence of Newton rings was evaluated by a method below. First, each optical film was placed on a black acrylic plate so that a surface of the optical film, the surface having an optical layer thereon, was in contact with the black acrylic plate. A load of 300 g/cm$^2$ was applied from a surface opposite the optical layer and occurrence or non-occurrence of Newton rings was evaluated by visual observation.

Note that "○" and "x" in Tables 2 and 4 represent the following evaluation results.

○: Occurrence of Newton rings was not observed.

x: Occurrence of Newton rings was observed.

(Glare)

For each of the optical films of Examples 19 and 23 and Comparative Examples 1 and 7, occurrence or non-occurrence of glare was evaluated by a method below. An acrylic plate was disposed above the front surface of a notebook PC including a 13-inch liquid crystal display, with an air layer therebetween. Each optical film was bonded on the liquid crystal display side of the acrylic plate, with a tackiness agent therebetween. Monochromatic white was displayed to evaluate whether glare occurred or not.

Note that "○" and "x" in Tables 2 and 4 represent the following evaluation results.

○: Occurrence of glare was not observed.

x: Occurrence of glare was observed.

Tables 1 to 4 show the evaluation results of the antiglare films of Examples and Comparative Examples

TABLE 1

| | | Filler | | | | | | | | | | |
|---|---|---|---|---|---|---|---|---|---|---|---|---|
| | | Average particle diameter | Coefficient of variation | Content [parts by weight] | Polymer content [wt %] | Film thickness [μm] | D/T × 100 [%] | Glossiness | | | Opacity | Curling |
| | Refractive index | [μm] | | | | | | 20° | 60° | 85° | | |
| Example 1 | 1.515 | 5.5 | 7 | 12.5 | 10 | 10.9 | 50% | 24.7 | 72.4 | 97.6 | 0.68 | ⊙ |
| Example 2 | 1.515 | 5.5 | 7 | 12.5 | 10 | 11.6 | 47% | 25.0 | 72.2 | 97.3 | 0.68 | ⊙ |
| Example 3 | 1.515 | 5.5 | 7 | 12.5 | 10 | 12.8 | 43% | 30.4 | 76.4 | 98.0 | 0.60 | ⊙ |
| Example 4 | 1.515 | 5.5 | 7 | 12.5 | 10 | 14.4 | 38% | 34.6 | 79.1 | 98.1 | 0.53 | ⊙ |
| Example 5 | 1.515 | 5.5 | 7 | 12.5 | 10 | 16.3 | 34% | 39.1 | 81.3 | 98.5 | 0.48 | ○ |
| Example 6 | 1.515 | 5.5 | 7 | 12.5 | 3 | 13.0 | 42% | 20.8 | 67.9 | 95.1 | 0.69 | ⊙ |
| Example 7 | 1.515 | 5.5 | 7 | 12.5 | 10 | 10.2 | 54% | 24.3 | 72.9 | 97.7 | 0.65 | ⊙ |
| Example 8 | 1.515 | 5.5 | 7 | 20.0 | 13 | 10.2 | 54% | 19.4 | 64.7 | 95.2 | 0.89 | ⊙ |
| Example 9 | 1.515 | 5.5 | 7 | 20.0 | 13 | 9.4 | 59% | 19.2 | 64.9 | 94.8 | 0.88 | ⊙ |
| Example 10 | 1.515 | 5.5 | 7 | 25.0 | 18 | 14.3 | 39% | 17.8 | 64.2 | 93.7 | 0.83 | ⊙ |
| Example 11 | 1.515 | 5.5 | 7 | 25.0 | 18 | 14.1 | 39% | 17.3 | 63.5 | 93.1 | 0.78 | ⊙ |
| Example 12 | 1.515 | 5.5 | 7 | 27.5 | 13 | 22.3 | 25% | 20.9 | 68.4 | 94.0 | 0.77 | Δ |
| Example 13 | 1.525 | 5 | 7 | 27.5 | 13 | 17.2 | 29% | 34.9 | 75.1 | 96.9 | 0.58 | ○ |
| Example 14 | 1.505 | 5 | 8 | 27.5 | 13 | 15.3 | 33% | 38.1 | 76.9 | 97.4 | 0.63 | ○ |
| Example 15 | 1.515 | 5.5 | 7 | 37.5 | 13 | 14.6 | 38% | 31.4 | 73.3 | 96.8 | 0.83 | ⊙ |
| Example 16 | 1.515 | 5.5 | 7 | 42.5 | 13 | 14.1 | 39% | 22.4 | 67.1 | 95.6 | 0.95 | ⊙ |
| Example 17 | 1.515 | 5.5 | 7 | 12.5 | 20 | 11.5 | 48% | 17.9 | 65.6 | 95.2 | 0.82 | ⊙ |
| Example 18 | 1.515 | 5.5 | 7 | 10.0 | 10 | 10.5 | 52% | 22.3 | 68.4 | 95.4 | 0.65 | ⊙ |
| Comparative Example 1 | 1.560 | 5.2 | 31 | 7.5 | 5 | 6.1 | 85% | 35.1 | 71.5 | 92.9 | 0.65 | ⊙ |
| Comparative Example 2 | 1.560 | 5.2 | 31 | 7.5 | 5 | 7.4 | 71% | 37.6 | 74.1 | 94.6 | 0.57 | ⊙ |
| Comparative Example 3 | 1.515 | 5.5 | 7 | 12.5 | 10 | 7.3 | 75% | 14.1 | 57.2 | 95.4 | 1.04 | ⊙ |
| Comparative Example 4 | 1.515 | 5.5 | 7 | 27.5 | 0 | 13.7 | 40% | 12.8 | 57.8 | 90.4 | 1.05 | ○ |
| Comparative Example 5 | 1.515 | 5.5 | 7 | 27.5 | 25 | 11.9 | 46% | 14.1 | 54.4 | 84.9 | 1.42 | ⊙ |
| Comparative Example 6 | 1.495 | 5 | 8 | 27.5 | 13 | 13.5 | 37% | 42.5 | 79.2 | 97.7 | 0.57 | ⊙ |

TABLE 2

| | Image clarity | | | | | | Haze | | | Sparseness | Suppression | | |
|---|---|---|---|---|---|---|---|---|---|---|---|---|---|
| | Clarity TTL | 0.125 | 0.25 | 0.5 | 1 | 2 | C(0.125)/C(2) × 100 | Haze TTL | Inner | Outer | and denseness | Antiglare property | of Newton rings | Glare |
| Example 1 | 346.8 | 85.6 | 85.4 | 86.0 | 86.6 | 88.6 | 97% | 4.2 | 5.8 | −1.6 | ○ | C | — | — |
| Example 2 | 341.6 | 84.5 | 84.3 | 84.5 | 84.9 | 87.7 | 96% | 4.6 | 6.2 | −1.6 | ○ | C | — | — |
| Example 3 | 346.9 | 85.9 | 85.7 | 85.8 | 86.1 | 89.0 | 97% | 5.2 | 7.3 | −2.1 | ○ | C | — | — |
| Example 4 | 349.5 | 86.3 | 86.2 | 86.3 | 86.4 | 90.4 | 95% | 5.9 | 7.2 | −1.3 | ○ | C | — | — |
| Example 5 | 349.0 | 86.2 | 86.1 | 86.2 | 86.0 | 90.6 | 95% | 6.1 | 7.8 | −1.7 | ○ | C | — | — |
| Example 6 | 306.0 | 73.6 | 74.4 | 74.7 | 74.5 | 83.2 | 89% | 8 | 9.5 | −1.5 | ○ | C | — | — |
| Example 7 | 348.7 | 84.6 | 85.1 | 86.8 | 87.8 | 89.5 | 95% | 4.1 | 5.9 | −1.8 | ○ | C | — | — |
| Example 8 | 319.3 | 76.5 | 76.0 | 77.8 | 80.0 | 85.0 | 90% | 3.1 | 4.6 | −1.5 | ○ | C | — | — |
| Example 9 | 304.7 | 68.6 | 67.0 | 71.5 | 79.0 | 85.6 | 80% | 2.9 | 4.6 | −1.7 | ○ | C | — | — |
| Example 10 | 248.4 | 51.9 | 52.3 | 57.3 | 62.4 | 76.8 | 68% | 7.2 | 8.3 | −1.1 | ○ | C | — | — |
| Example 11 | 239.0 | 48.9 | 49.3 | 54.7 | 59.6 | 75.8 | 65% | 7.3 | 8.3 | −1 | ○ | C | — | — |
| Example 12 | 263.2 | 52.9 | 54.8 | 58.0 | 66.4 | 85.9 | 62% | 4.98 | 4.3 | 0.67 | ○ | C | — | — |
| Example 13 | 343.1 | 84.0 | 84.4 | 85.0 | 85.1 | 89.0 | 94% | 1.4 | 1.3 | 0.1 | ○ | C | — | — |
| Example 14 | 362.7 | 89.9 | 90.0 | 90.3 | 90.6 | 91.9 | 98% | 27.4 | 30.1 | −2.7 | ○ | C | — | — |
| Example 15 | 340.1 | 80.5 | 79.7 | 82.7 | 86.0 | 90.9 | 89% | 9.3 | 9.9 | −0.6 | ○ | C | — | — |
| Example 16 | 297.9 | 63.6 | 62.1 | 65.7 | 79.1 | 89.5 | 71% | 7.5 | 8.9 | −1.4 | ○ | C | — | — |
| Example 17 | 314.9 | 75.0 | 72.7 | 76.6 | 78.3 | 85.0 | 88% | 4.6 | 5.4 | −0.8 | ○ | C | — | — |
| Example 18 | 322.9 | 78.9 | 79.2 | 80.2 | 80.8 | 83.0 | 95% | 2.8 | 4.0 | −1.2 | ○ | C | — | — |
| Comparative Example 1 | 169.5 | 11.2 | 16.9 | 34.9 | 54.3 | 69.2 | 16% | 10.6 | 5.1 | 5.4 | ○ | B | ○ | x |
| Comparative Example 2 | 202.0 | 28.8 | 35.9 | 47.7 | 56.8 | 68.7 | 42% | 10.5 | 5.6 | 4.9 | ○ | D | — | — |
| Comparative Example 3 | 277.6 | 38.7 | 53.3 | 71.1 | 81.9 | 85.9 | 45% | 4.3 | 6.7 | −2.4 | ○ | C | — | — |
| Comparative Example 4 | 196.6 | 30.4 | 30.8 | 39.6 | 52.1 | 74.5 | 41% | 5.9 | 6.8 | −0.9 | ○ | B | — | — |
| Comparative Example 5 | 169.2 | 32.5 | 32.1 | 31.3 | 38.3 | 67.2 | 48% | 5.2 | 2.8 | 2.4 | ○ | A | — | — |
| Comparative Example 6 | 369.6 | 91.7 | 91.8 | 92.1 | 92.4 | 93.4 | 98% | 46.4 | 48.7 | −2.3 | x | D | x | ○ |

Clarity TTL: C(0.125) + C(0.5) + C(1) + C(2)
Haze TTL: Total haze
Inner: Internal Haze
Outer: Surface haze

| | Filler | | | | | | | | | | | |
|---|---|---|---|---|---|---|---|---|---|---|---|---|
| | Refractive index | Average particle diameter [μm] | Coefficient of variation | Content [parts by weight] | Polymer content [wt %] | Film thickness [μm] | D/T × 100 [%] | 20° | 60° | 85° | Opacity | Curling |
| Example 19 | 1.525 | 5.0 | 7 | 10.0 | 10 | 11.7 | 43% | 28.5 | 73.6 | 96.9 | 0.72 | ⊙ |
| Example 20 | 1.525 | 5.0 | 7 | 10.0 | 10 | 13.0 | 39% | 31.6 | 76.8 | 97.3 | 0.68 | ⊙ |
| Example 21 | 1.505 | 5.0 | 8 | 10.0 | 10 | 11.8 | 42% | 30.0 | 73.6 | 97.8 | 0.72 | ⊙ |
| Example 22 | 1.515 | 5.5 | 7 | 10.0 | 10 | 13.7 | 40% | 12.1 | 44.9 | 93.2 | 0.24 | ○ |
| Example 23 | 1.525 | 5.0 | 7 | 10.0 | 10 | 8.9 | 56% | 12.0 | 45.1 | 94.0 | 0.28 | ⊙ |
| Example 24 | 1.515 | 5.0 | 7 | 27.5 | 13 | 13.5 | 37% | 51.9 | 85.2 | 96.5 | 0.58 | ⊙ |
| Example 25 | 1.515 | 5.0 | 7 | 27.5 | 13 | 15.4 | 33% | 53.9 | 86.3 | 97.1 | 0.48 | ○ |
| Example 26 | 1.515 | 5.0 | 7 | 27.5 | 13 | 17.3 | 29% | 51.1 | 86.3 | 95.3 | 0.47 | ○ |

| | Image clarity | | | | | | Haze | | | Sparseness | Suppression | | |
|---|---|---|---|---|---|---|---|---|---|---|---|---|---|
| | Clarity TTL | 0.125 | 0.25 | 0.5 | 1 | 2 | C(0.125)/C(2) × 100 | Haze TTL | Inner | Outer | and denseness | Antiglare property | of Newton rings | Glare |
| Example 19 | 317.9 | 78.5 | 78.2 | 78.5 | 78.2 | 82.7 | 95% | 13.2 | 15.2 | −2.0 | ○ | C | ○ | ○ |
| Example 20 | 320.2 | 78.7 | 78.5 | 78.8 | 78.4 | 84.2 | 93% | 1.5 | 0.5 | 1.0 | ○ | C | — | — |
| Example 21 | 357.2 | 88.9 | 88.9 | 89.5 | 88.8 | 90.0 | 99% | 1.3 | 0.6 | 0.8 | ○ | C | — | — |
| Example 22 | 344.9 | 84.9 | 85.2 | 85.5 | 85.1 | 89.4 | 95% | 5.8 | 5.8 | −0.1 | ○ | C | — | — |
| Example 23 | 327.0 | 70.2 | 76.3 | 83.2 | 85.6 | 88.0 | 80% | 1.4 | 1.0 | 0.5 | ○ | C | ○ | ○ |
| Example 24 | 312.8 | 67.3 | 65.6 | 72.1 | 82.5 | 91.0 | 74% | 2.3 | 3.0 | −0.7 | ○ | A | — | — |
| Example 25 | 313.6 | 69.5 | 68.8 | 73.6 | 80.5 | 90.1 | 77% | 2.8 | 3.2 | −0.4 | ○ | A | — | — |
| Example 26 | 273.4 | 53.6 | 56.4 | 59.0 | 70.3 | 90.6 | 59% | 3.4 | 3.2 | 0.2 | ○ | A | — | — |

Clarity TTL: C(0.125) + C(0.5) + C(1) + C(2)
Haze TTL: Total haze
Inner: Internal Haze
Outer: Surface haze The following can be understood from Tables 1 and 2.

In Examples 1 to 18, (1) organic fine particles are distributed densely in some regions and sparsely in other regions (refer to FIGS. 18 and 19), (2) the polymer content is 3% by weight or more and 20% by weight or less, (3) the average particle diameter of the organic fine particles is 2 μm or more and 8 μm or less, and (4) the ratio ((D/T)×100) of the average particle diameter D of the fine particles to the average film thickness T is 20% or more and 70% or less. Accordingly, the transmitted image clarity value measured with an optical comb having a width of 0.125 mm can be made to be 45 or more.

In contrast, as for Comparative Examples 1 to 3, although Comparative Examples 1 to 3 are the same as Examples 1 to 18 in terms of (1) to (3), they are different from Examples 1 to 18 in terms of (4). Accordingly, the transmitted image clarity value measured with an optical comb having a width of 0.125 mm is less than 45.

As for Comparative Example 4, although Comparative Example 4 is the same as Examples 1 to 18 in terms of (1), (3), and (4), it is different from Examples 1 to 18 in terms of (2). Accordingly, the transmitted image clarity is less than 45 and the opacity also exceeds 1.0. The reason for this is as follows. In Comparative Example 4, an adequate particle distribution is formed using the MS filler. However, since no polymer is added, cure shrinkage is large and the surface is roughened.

As for Comparative Example 5, although Comparative Example 5 is the same as Examples 1 to 18 in terms of (1), (3), and (4), it is different from Examples 1 to 18 in terms of (2). Accordingly, the transmitted image clarity is less than 45 and the opacity also significantly exceeds 1.0. The reason for this is as follows. When the amount of polymer added is excessively large, the viscosity of the resulting coating material increases, resulting in degradation of dispersion of particles (refer to FIG. 20). Thus, sparseness and denseness of the fine particles become clearly identified more than necessary. Consequently, the difference in cure shrinkage notably appears between the sparse and dense portions.

As for Comparative Example 6, although Comparative Example 6 is the same as Examples 1 to 18 in terms of (2) to (4), it is different from Examples 1 to 18 in terms of (1). Accordingly, the 20° glossiness exceeds 40. The reason for this is as follows. Since the acrylic particles are used in Comparative Example 6, the particles are uniformly dispersed (refer to FIG. 21) and the acrylic particles cannot form sparse portions and dense portions. Consequently, the surface of the antiglare layer is planar.

Since Examples 19 to 26 satisfy (1) to (4) as in Examples 1 to 18, the transmitted image clarity value measured with an optical comb having a width of 0.125 mm can be made to be 45 or more.

Furthermore, the following can be understood from Examples 19 and 23 and Comparative Examples 1 and 6, for which the occurrence or non-occurrence of Newton rings and glare were evaluated.

Since Examples 19 and 23 satisfy (1) to (4), the occurrence of Newton rings and glare can be suppressed.

In contrast, although Comparative Example 1 is the same as Examples 19 and 23 in that it satisfies (1) to (3), Comparative Example 1 is different from Examples 19 and 23 in that it does not satisfy (4). Accordingly, the occurrence of Newton rings can be suppressed, but glare cannot be suppressed.

Furthermore, although Comparative Example 6 is the same as Examples 19 and 23 in terms of (2) to (4), Comparative Example 6 is different from Examples 19 and 23 in terms of (1). Accordingly, the occurrence of glare can be suppressed, but the occurrence of Newton rings cannot be suppressed.

In addition, the following can be understood from FIG. 16.

When the 20° glossiness Gs(20°) and the 60° glossiness Gs(60°) satisfy the relationship represented by formula (1) below, reflection can be suppressed and high photopic contrasts can be achieved.

$$Gs(60°) > Gs(20°) \times 0.75 + 48 \tag{1}$$

(Here, Gs(20°) is preferably in the range of Gs(20°)≤40, and more preferably in the range of 10≤Gs(20°)≤40.)

Also, the following can be understood from FIG. 17.

When the 20° glossiness Gs(20°) and the 60° glossiness Gs(60°) satisfy the relationship represented by formula (1) below, reflection can be negligible, and very high light-and-dark contrasts can be achieved.

$$Gs(60°) > Gs(20°) \times 0.25 + 72 \tag{2}$$

(Here, Gs(20°) is preferably in the range of 40≤Gs(20°)≤80, more preferably in the range of 50≤Gs(20°)≤70, and further preferably in the range of 50≤Gs(20°)≤65.)

The numerical values, shapes, materials, structures, and the like described in the embodiments and Examples described above are merely examples, and other numerical values, shapes, materials, structures, and the like, all of which are different from the above, may be used according to need.

Furthermore, in the embodiments described above, examples of optical films provided on display surfaces of liquid crystal displays and methods for manufacturing such optical films have been described. However, the embodiments are applicable to optical films used on display surfaces of various display apparatuses such as cathode ray tube (CRT) displays, plasma display panels (PDPs), electro luminescence (EL) displays, and surface-conduction electron-emitter displays (SEDs), and to methods for manufacturing such optical films.

Furthermore, in the embodiments and Examples described above, examples in which the optical film of the present invention is used as an antiglare film and an anti-Newton ring film have been described. However, the usages of the optical film are not limited to these, and the optical film of the present invention is applicable to various other usages where both high transmission clarity and an irregular shape are desired.

Furthermore, in the embodiments described above, examples that are applied to display apparatuses have been described, but the present embodiments are not limited thereto. For example, the present embodiments are also applicable to touch panels.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. An optical film comprising:
   a base member; and
   an optical layer provided on the base member,
   wherein the optical layer has an irregular shape on a surface thereof,
   the irregular shape is obtained by applying a coating material containing fine particles and a resin onto the base member, distributing the fine particles densely in some regions and sparsely in other regions by convection that occurs in the coating material, and curing the coating material, the resin contains 3% by weight or more and 20% by weight or less of a polymer, the fine particles are organic fine particles having an average particle diameter of 2 μm or more and 8 μm or less, a ratio ((D/T)×100) of the average particle diameter D of the fine particles to an average film thickness T of the optical layer is 20% or more and 70% or less, and a transmitted image clarity value measured with an optical comb having a width of 0.125 mm is 45 or more.

2. The optical film according to claim 1, wherein the fine particles contain an acryl/styrene copolymer as a main component.

3. The optical film according to claim 1, wherein a ratio ([C(0.125)/C(2.0)]×100) of the transmitted image clarity C(0.125) measured with an optical comb having a width of 0.125 mm to a transmitted image clarity C(2.0) measured with an optical comb having a width of 2.0 mm is 50% or more.

4. The optical film according to claim 1, wherein the sum of transmitted image clarity measured with optical combs having a width of 0.125 mm, 0.5 mm, 1.0 mm, and 2.0 mm is 220 or more.

5. The optical film according to claim 1, wherein a surface haze of the optical film is zero.

6. The optical film according to claim 1, wherein when a 20° glossiness is represented by Gs(20°) and a 60° glossiness is represented by Gs(60°), Gs(20°) and Gs(60°) satisfy the relationship represented by formula (1) below:

$$Gs(60°) > Gs(20°) \times 0.75 + 48 \quad (1).$$

7. The optical film according to claim 6, wherein the 20° glossiness is 40 or less.

8. The optical film according to claim 1, wherein when a 20° glossiness is represented by Gs(20°) and a 60° glossiness is represented by Gs(60°), Gs(20°) and Gs(60°) satisfy the relationship represented by formula (2) below:

$$Gs(60°) > Gs(20°) \times 0.25 + 72 \quad (2)$$

(where Gs(20°) is in the range of 40≤Gs(20°)≤80).

9. The optical film according to claim 1, wherein the amount of fine particles added is 8 parts by weight or more and 50 parts by weight or less per 100 parts by weight of the resin.

10. The optical film according to claim 1, wherein the difference in refractive index between the fine particles and the resin contained in the optical layer is 0.03 or less.

11. The optical film according to claim 1, wherein the average film thickness of the optical layer is 8 μm or more and 25 μm or less.

12. The optical film according to claim 1, wherein the resin contains 3% by weight or more and 20% by weight or less of a polymer and 80% by weight or more and 97% by weight or less of an oligomer and/or a monomer.

13. The optical film according to claim 12, wherein the resin contains 3% by weight or more and 20% by weight or less of a polymer and 80% by weight or more and 97% by weight or less of an oligomer.

14. An antiglare film comprising:
a base member; and
an antiglare layer provided on the base member,
wherein the antiglare layer has an irregular shape on a surface thereof,
the irregular shape is obtained by applying a coating material containing fine particles and a resin onto the base member, distributing the fine particles densely in some regions and sparsely in other regions by convection that occurs in the coating material, and curing the coating material,
the resin contains 3% by weight or more and 20% by weight or less of a polymer,
the fine particles are organic fine particles having an average particle diameter of 2 μm or more and 8 μm or less,
a ratio ((D/T)×100) of the average particle diameter D of the fine particles to an average film thickness T of the antiglare layer is 20% or more and 70% or less, and
a transmitted image clarity value measured with an optical comb having a width of 0.125 mm is 45 or more.

15. A method for manufacturing an optical film, the method comprising:
applying a coating material containing fine particles and a resin onto a base member and distributing the fine particles densely in some regions and sparsely in other regions by convection that occurs in the coating material; and
curing the coating material in such a manner that the coating material in the regions where the fine particles are sparsely distributed is significantly shrunk compared with the coating material in the regions where the fine particles are densely distributed to form an optical layer,
wherein the resin contains 3% by weight or more and 20% by weight or less of a polymer,
the fine particles are organic fine particles having an average particle diameter of 2 μm or more and 8 μm or less,
a ratio ((D/T)×100) of the average particle diameter D of the fine particles to an average film thickness T of the optical layer is 20% or more and 70% or less, and
a transmitted image clarity value measured with an optical comb having a width of 0.125 mm is 45 or more.

16. A polarizer with an optical layer, comprising:
a polarizer; and
an optical layer provided on the polarizer,
wherein the optical layer has an irregular shape on a surface thereof,
the irregular shape is obtained by applying a coating material containing fine particles and a resin, distributing the fine particles densely in some regions and sparsely in other regions by convection that occurs in the coating material, and curing the coating material,
the resin contains 3% by weight or more and 20% by weight or less of a polymer,
the fine particles are organic fine particles having an average particle diameter of 2 μm or more and 8 μm or less,
a ratio ((D/T)×100) of the average particle diameter D of the fine particles to an average film thickness T of the optical layer is 20% or more and 70% or less, and
a transmitted image clarity value measured with an optical comb having a width of 0.125 mm is 45 or more.

17. A display apparatus comprising:
a display unit that displays an image; and
an optical layer provided on a display surface side of the display unit,
wherein the optical layer has an irregular shape on a surface thereof,
the irregular shape is obtained by applying a coating material containing fine particles and a resin, distributing the fine particles densely in some regions and sparsely in other regions by convection that occurs in the coating material, and curing the coating material,
the resin contains 3% by weight or more and 20% by weight or less of a polymer,
the fine particles are organic fine particles having an average particle diameter of 2 μm or more and 8 μm or less, a ratio ((D/T)×100) of the average particle diameter D of the fine particle s to an average film thickness T of the optical layer is 20% or more and 70% or less, and a transmitted image clarity value measured with an optical comb having a width of 0.125 mm is 45 or more.

18. A display apparatus comprising:

a display unit;

a front surface member provided at a front surface side of the display unit; and an optical layer provided on at least one of the front surface side of the display unit and a rear surface side of the front surface member, wherein the optical layer has an irregular shape on a surface thereof, the irregular shape is obtained by applying a coating material containing fine particles and a resin, distributing the fine particles densely in some regions and sparsely in other regions by convection that occurs in the coating material, and curing the coating material, the resin contains 3% by weight or more and 20% by weight or less of a polymer, the fine particles are organic fine particles having an average particle diameter of 2 μm or more and 8 μm or less, a ratio ((D/T)×100) of the average particle diameter D of the fine particles to an average film thickness T of the optical layer is 20% or more and 70% or less, and a transmitted image clarity value measured with an optical comb having a width of 0.125 mm is 45 or more.

19. A display apparatus comprising:

a display unit;

a rear surface member provided at a rear surface side of the display unit; and an optical layer provided on at least one of the rear surface side of the display unit and a front surface side of the rear surface member, wherein the optical layer has an irregular shape on a surface thereof, the irregular shape is obtained by applying a coating material containing fine particles and a resin, distributing the fine particles densely in some regions and sparsely in other regions by convection that occurs in the coating material, and curing the coating material, the resin contains 3% by weight or more and 20% by weight or less of a polymer, the fine particles are organic fine particles having an average particle diameter of 2 μm or more and 8 μm or less, a ratio ((D/T)×100) of the average particle diameter D of the fine particles to an average film thickness T of the optical layer is 20% or more and 70% or less, and a transmitted image clarity value measured with an optical comb having a width of 0.125 mm is 45 or more.

* * * * *